United States Patent
Suzui

(10) Patent No.: US 6,256,153 B1
(45) Date of Patent: Jul. 3, 2001

(54) CIRCUMSCRIBING RAY ROUTE LENS, THE SYSTEM CONDENSING LIGHT THEREWITH, AND THE LIGHTING THEREWITH

(76) Inventor: Souhei Suzui, 1-12 Ebisu-choo Gifu-city, Gifu-prefecture (JP)

( * ) Notice: Subject to any disclaimer, the term of this patent is extended or adjusted under 35 U.S.C. 154(b) by 0 days.

(21) Appl. No.: 09/372,066

(22) Filed: Aug. 11, 1999

(51) Int. Cl.⁷ .............. G02B 3/00; G02B 5/10; G03F 5/00; F24C 13/00
(52) U.S. Cl. .......... 359/642; 359/893; 359/869; 126/5
(58) Field of Search ............ 359/642, 83, 869; 126/5

(56) References Cited

U.S. PATENT DOCUMENTS 4,153,813 * 5/1979 Blieden .................. 136/89

* cited by examiner

Primary Examiner—Georgia Epps
Assistant Examiner—Michael A. Lucas
(74) Attorney, Agent, or Firm—Kolisch Hartwell Dickinson McCormack & Heuser

(57) ABSTRACT

A lens circumscribing rays of light incident thereupon from various directions within a fixed region, the system condensing light therewith, and the lighting therewith, are provided. Plural circumscribing ray route lenses 1 characterized by; a refraction condensing light means for transmitting the incident light within a fixed region by refraction in accordance with the region of the incidence angle, and a total reflection condensing light means for transmitting the incident light within a fixed region by total reflection in accordance with the region of the incidence angle: are arranged in a state of transmitted light being emitted within the energy receiver section 12 as a elected region for condensing the sunlight in accordance with the arrangement location of each said lens (FIG. 8)

23 Claims, 23 Drawing Sheets

| angle of incidence | angle of refraction | angle of variation |
|---|---|---|
| R 45° | R 60° | −15° |
| R 30° | R 25° | 5° |
| R 15° | R 5° | 10° |
| 0° | R 5° | −5° |
| L 15° | L 5° | 10° |
| L 30° | R 10° | 40° |
| L 45° | R 29° | 74° |

CIRCUMSCRIBING RAY ROUTE LENS, THE SYSTEM CONDENSING LIGHT THEREWITH, AND THE LIGHTING THEREWITH

FIELD OF THE INVENTION

The present invention pertains to a circumscribing ray route lens, the system condensing light therewith, and the lighting therewith; in particular to a lens circumscribing rays of light incident thereupon from various directions within a fixed region, the system condensing light therewith, and the lighting therewith.

BACKGROUND OF THE INVENTION

To date, the sunlight has been used after transduced into thermic energy or electric energy. In case of using the sunlight as thermic energy, the thermic energy thereof has been used after being absorbed by some apparatus for absorbing thermic energy as a solar hot-water generator for example. In case of using the sunlight as electric energy, the sunlight has been used after transduced into electric energy by solar cells.

By the way, the solar energy absorbed by the apparatus for absorbing thermic energy or solar cells consists of various rays different in wavelength which irradiate the surface of the earth. And the solar energy which can reach the earth's surface is only about 1 kilowatt per square meter. The energy is very thinner than the energy derived from heat of combustion. So, in case of using the solar energy, it has to be condensed.

For example, in case the apparatus for absorbing thermic energy is a solar hot-water generator, the sunlight should be condensed in order that water might be heated as hot as possible. In case of generating electricity from sunlight, nowadays it costs 35 years to generate electricity for making the solar cells. So generating electricity from sunlight with solar cells isn't of practical use. Generating electricity from sunlight as such can increase the electric power surely on condition that the sunlight may be condensed, because the efficiency of generating electricity with the solar cells doesn't depend on the density of the sunlight.

In brief, if I can increase the quantity of light which the solar cells will receive with a certain way much cheaper than with a way of increasing other solar cells, the cost of equipment per unit electric energy will be able to go down. In this way, in case of using the thin solar energy, it is better to use the solar energy after having condensed. A convex lens, a Fresnel lens and a concave mirror and so on are thought as means for condensing light.

However, in case of using a convex lens as the means for condensing sunlight as described before, the central part of lens has become thicker in accordance with condensing the light more widely. And the cost of equipment has been more expensive. So the cost of equipment per unit electric energy has not been able to go down, and the transmission factor of the sunlight has decreased.

In addition to this, the direction to which the sunlight is emitted has changed every moment during the day, and the directions of the lights transmitted through the convex lens have been various as a matter of course. Therefore, in case of fixing the convex lens to a proper position, sometimes the sunlight has been condensed out of the apparatus for absorbing thermic energy or solar cells in accordance with the direction of the sunlight is emitted. Then the sunlight has not been able to be used effectively.

In case of using the concave mirror as means for condensing the sunlight, the system has not been cheap enough for being made. And especially in case the position and direction of the concave mirror are fixed, the sunlight has not been able to be condensed effectively in accordance with the direction of the sunlight.

In case of using the Fresnel lens as means for condensing the sunlight, the system has been cheap enough for being made. And the transmission factor of the sunlight never decreases in accordance with the scale of the system. At these points the Fresnel lens is better than the convex lens or the concave mirror. But another point the Fresnel lens is not always better than the convex lens or the concave mirror. It is that the Fresnel lens is not able to condense the sunlight in accordance with the direction of the sunlight is emitted as in case of the convex lens or the concave mirror.

In brief, in case of condensing sunlight with these existing means for condensing light effectively, the inclination angle of the means for condensing light has to be made follow the direction of the sunlight is emitted every moment. So the system for condensing light has been more expensive and it has cost great deal of time and labor to maintain the system.

In addition to this, when the sunlight scatters and the direction of the sunlight is irregular as on a cloudy day, the sunlight has never been condensed by existing means for condensing light any more.

SUMMARY AND OBJECTS OF THE INVENTION

It is an object of the present invention to provide a lens circumscribing rays of light incident thereupon from various directions within a fixed region, the system condensing light therewith, and the lighting therewith.

BRIEF DESCRIPTION OF THE DRAWINGS

A preferred form of the present invention is illustrated in the accompanying drawings in which.

DETAILED DESCRIPTION OF THE INVENTION

Figure 1:
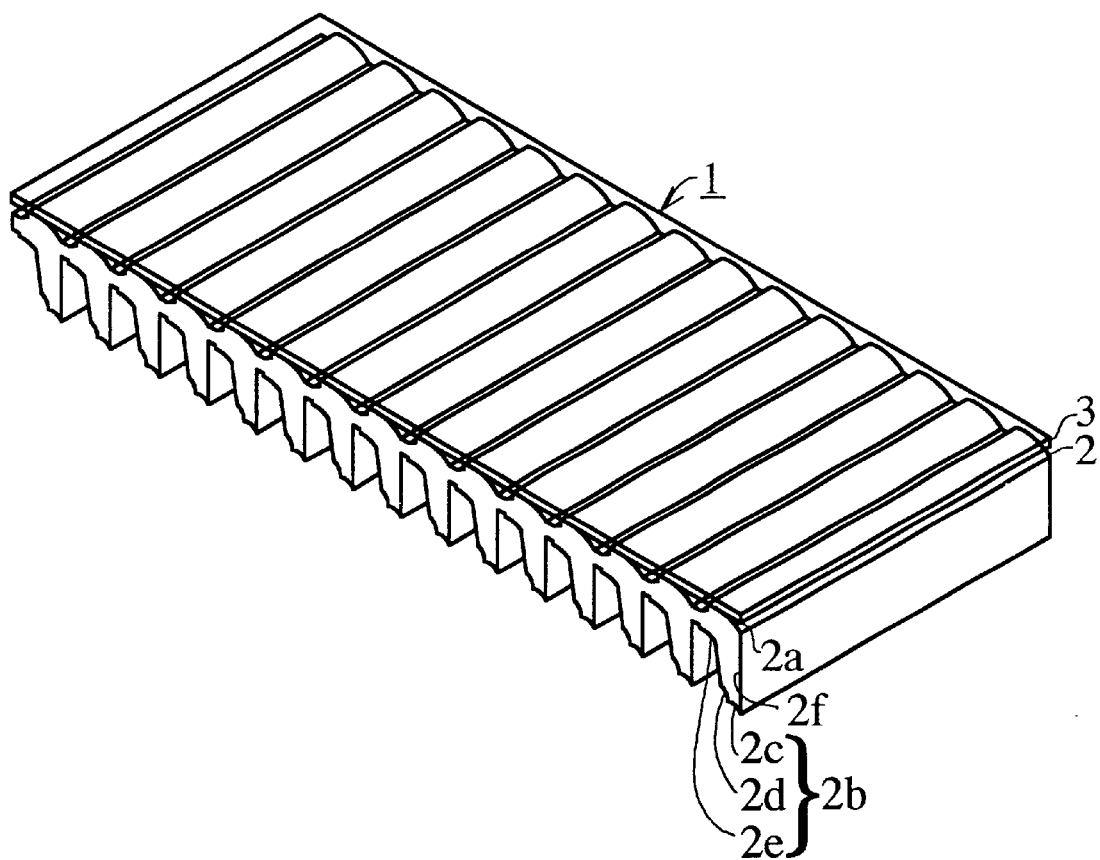
FIG. 1 is a perspective view of the circumscribing ray route lens of the present invention.

Below, working configurations of the present invention will be explained. FIG. 1 is a perspective view of the circumscribing ray route lens of the present invention; and FIG. 2 is an elevation of the circumscribing ray route lens of the present invention showing the process of condensing of the lens.

Figure 2:
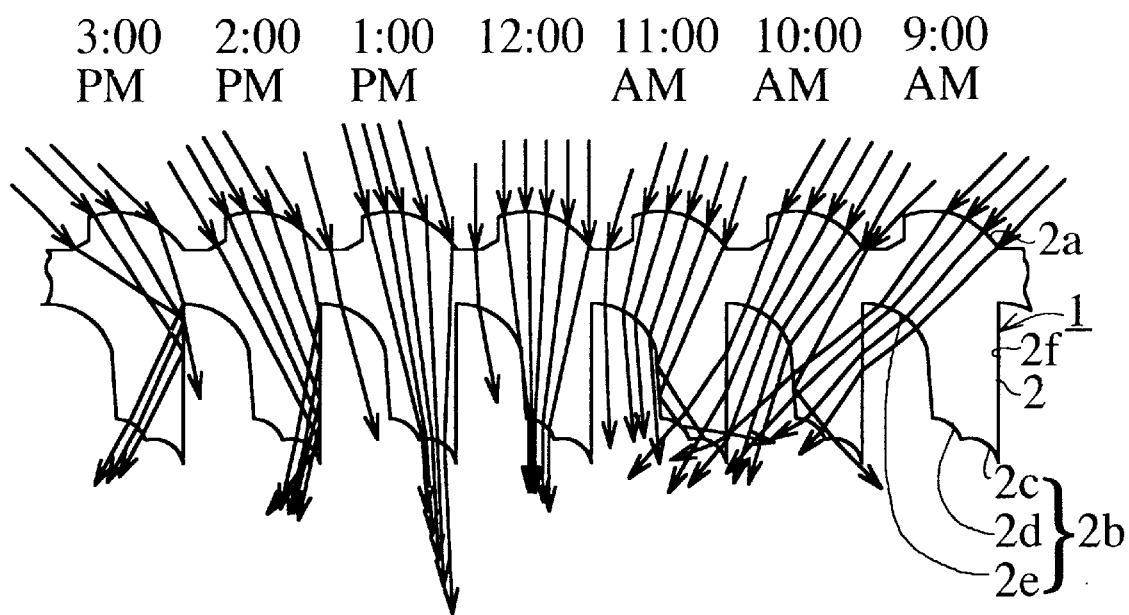
FIG. 2 is an elevation of the circumscribing ray route lens of the present invention showing the process of condensing of the lens.

As shown in FIG. 1 and FIG. 2, the circumscribing ray route lens 1 of the present invention is made up of methacrylic resin of which transmission factor is higher than that of another transparent material, composed of plural circumscribing ray route sections 2 being combined, and flat in shape like a flat board on the whole.

Each of the circumscribing ray route sections 2 is characterized by: a ray receiver surface 2a to receive a ray of light incident from outside; a transmitted light emitter surface 2b to emit light transmitted through the lens; and a total reflection surface 2f to reflect totally the light received from the ray receiver surface 2a to the direction toward a fixed region on the way from the transmission route in accordance with the incident direction of the light, and whole of the circumscribing ray route sections 2 lie in a row toward the direction of the total reflection surface 2f being in series.

The transmitted light emitter surface 2b of each circumscribing ray route section 2 is divided into three transmitted light emitter surfaces: the first transmitted light emitter surface 2c; the second transmitted light emitter surface 2d; and the third transmitted light emitter surface 2e, in accordance with the transmission route of each ray of light transmitted through different part of the transmitted light emitter surface 2b.

The ray receiver surface 2a of the circumscribing ray route section 2 is convex in shape, and has a function to make the incident light converge in the midst of transmission process. On the other hand, each divided part of the transmitted light emitter surface 2b is concave in shape, and has a function to make the transmitted light from in a state of convergence to a state of parallel.

Such circumscribing ray route lens 1 has a flat board 3 on it, so in case dust accumulates on the circumscribing ray route lens 1, the dust is easy to be got rid of.

In FIG. 2, on condition that the circumscribing ray route sections 2 lie toward east and west direction horizontally in a row in series, the routes of the sunlight irradiated to the circumscribing ray route lens 1 of the present invention every hour from 9 a.m. until 3 p.m. are shown. Further, the circumscribing ray route lens 1 of the present invention is arranged so that the total reflection surface 2f of each circumscribing ray route section 2 can point to the east.

Because of having such structure as described before, the circumscribing ray route lens 1 of the present invention has specific characters as follows. For example, on condition that the circumscribing ray route lens 1 of the present invention is arranged as shown in FIG. 2, if the sunlight is irradiated from the east as grasped from 9 a.m. till noon, the sunlight will be able to be transmitted toward the westside with the direction of progress being kept almost toward the same direction. On the other hand, if the sunlight is irradiated from the west as grasped from noon till 3 p.m., the sunlight will be transmitted toward the west side with the direction of progress being changed widely by reflection of the total reflection surface 2f. In brief, the circumscribing ray route lens 1 of the present invention can limit the direction of the transmitted light being emitted within a region of the west side whether the incident direction of the light is from east or west.

Figures 3, 4:
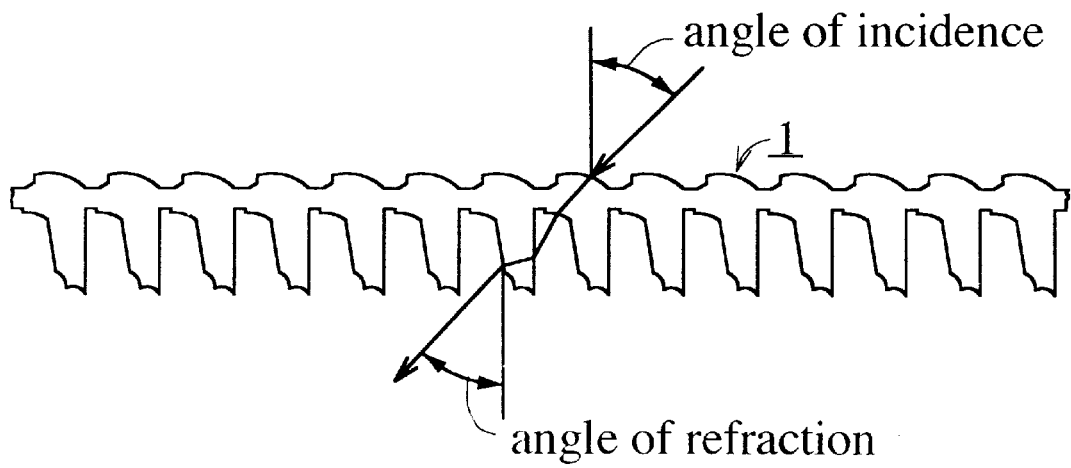
FIG. 3 is a diagram of the circumscribing ray route lens of the present invention showing the relation between the incidence angle and refraction angle of the lens.
FIG. 4 is a tabular statement of the circumscribing ray route lens of the present invention showing the relation between the incidence angle and refraction angle of the lens.

Here, special qualities of the circumscribing ray route lens 1 of the present invention will be explained more in more detail. As shown in FIG. 3, I will define the angle of the light incident into the circumscribing ray route lens 1 arranged horizontally of the present invention against the vertical axle as an angle of incidence (or an incidence angle). Likewise, I will define the angle of the light emitted outside after being transmitted through the circumscribing ray route lens 1 arranged horizontally of the present invention against the vertical axle as an angle of refraction (or a refraction angle).

In FIG. 4, the relation between the angle of incidence and the angle of refraction is shown. Especially, a character "R" is given in front of the numeral which means the incidence angle of the light from the east (or right against this document paper). And also a character "R" is given in front of the numeral which means the refraction angle of the light transmitted toward the west (or left against this document paper) by reason that the directions of light both before and after the transmission are almost same.

On the other hand, a character "L" is given in front of the numeral which means the incidence angle of the light from the west (or left against this document paper). And also a character "L" is given in front of the numeral which means the refraction angle of the light transmitted toward the east (or right against this document paper). In this way, the direction to which the light points is clarified.

Figure 5:
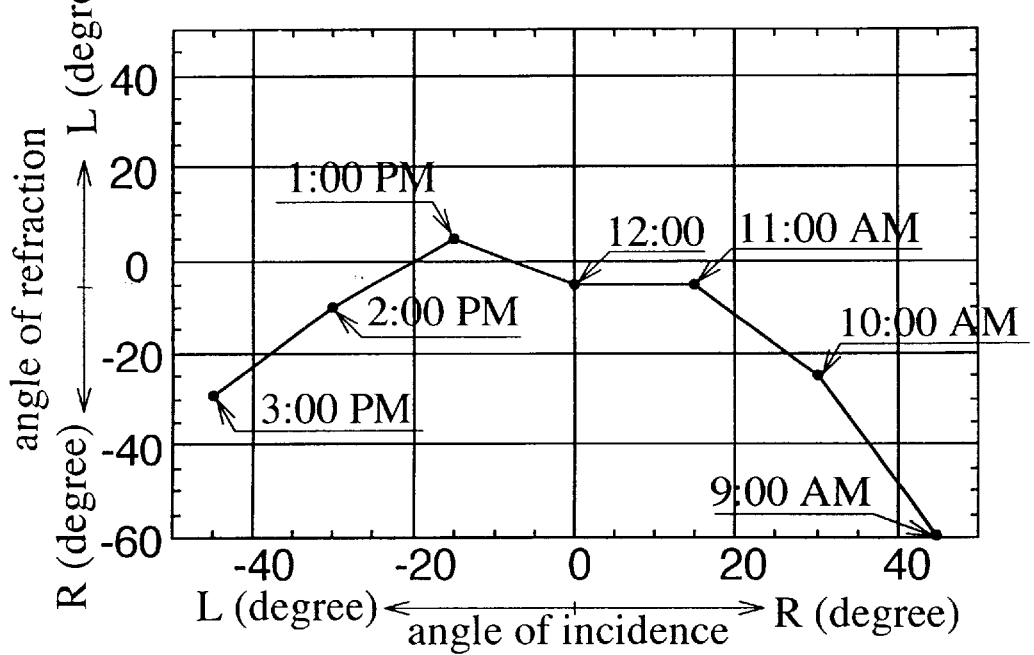
FIG. 5 is a graph of the circumscribing ray route lens of the present invention showing the relation between the incidence angle and refraction angle of the lens.

Besides, the variation of the directions of the incident light both before and after the transmission through the circumscribing ray route lens 1 of the present invention is shown as an angle of variation in FIG. 4. The numerals shown in FIG. 4 which mean the angle of incidence or the angle of refraction correspond to the time every one hour from 9 a.m. till 3 p.m. in a descending scale. FIG. 5 expresses the angle of incidence and the angle of refraction as a graph.

As shown in FIG. 5, in case that the arrangement of the circumscribing ray route lens 1 of the present invention is as in FIG. 2, the angle of refraction continues to become smaller responds to the time passing, and it seems that the angle of refraction may change from the west to the east at noon. But the direction of the light transmitted through the circumscribing ray route lens 1 is kept almost to the west in spite of various directions of the incident light.

In brief, the circumscribing ray route lens 1 of the present invention arranged as shown in FIG. 2 can transmit the incident light with the progress direction being left almost as it is in the morning, and in the afternoon the lens can keep the progress direction of the transmitted light same as that of in the morning also with total reflection. Therefore, the circumscribing ray route lens 1 of the present invention can condense the sunlight of which incidence angle changes momently almost within a fixed region. In case the sunlight scatters as on the cloudy day, the sunlight is able to be condensed surely.

Especially, FIGS. 4 and 5 show that the region from 0° till L30° of the incidence angle corresponds to the region from R5° till R25° of refraction angle, so the circumscribing ray route lens 1 of the present invention can limit the variation of the refraction angle against that of the incidence angle as small as possible even during the transmission of the incident light without total reflection.

Accordingly, the circumscribing ray route lens 1 of the present invention is characterized by: a refraction condensing light means for transmitting the incident light within a fixed region by refraction in accordance with the region of the incidence angle; and a total reflection condensing light means for transmitting the incident light within a fixed region by total reflection in accordance with the region of the incidence angle.

The circumscribing ray route lens 1 of the present invention is characterized by a total reflection surface 2f for transmitting the incident light within a fixed region by total reflection in accordance with the region of the incidence angle.

The circumscribing ray route lens 1 of the present invention is comprising plural circumscribing ray route sections 2: having the total reflection surface 2f; and lying in line shape toward the direction of the total reflection surface 2f being in series at a fixed distance.

The circumscribing ray route lens 1 of the present invention is characterized by: a ray receiver surface 2a convex in shape receiving incident light; a transmitted light emitter surface 2b (the first transmitted light emitter surface 2c, the second transmitted light emitter surface 2d, the third transmitted light emitter surface 2e) concave in shape emitting transmitted light.

The circumscribing ray route lens 1 of the present invention is characterized by a flat board 3 made up of transparent material on the side of the ray receiver surface 2a.

Figure 7:
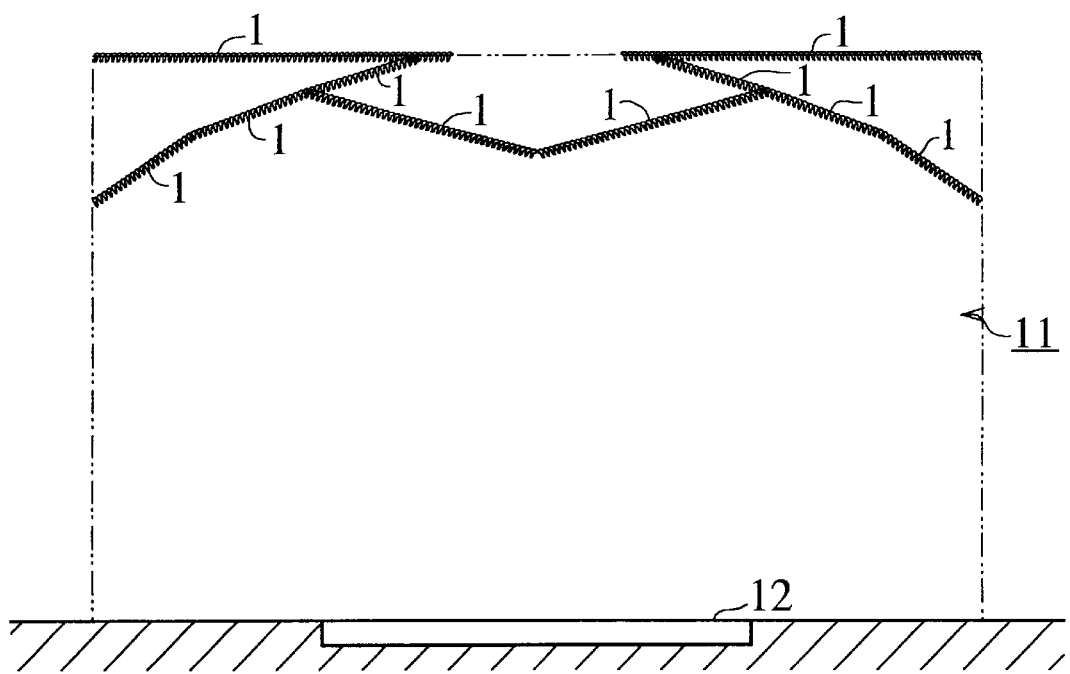
FIG. 7 is a vertical section view of the first working configuration of the condensing light system having the circumscribing ray route lens of the present invention.

Next, I will explain some working configurations with the circumscribing ray route lens 1 of the present invention. FIG. 7 is a vertical section view of the first working configuration of the condensing light system having the circumscribing ray route lens of the present invention.

The condensing light system 11 shown in FIG. 7 has said plural circumscribing ray route lens 1 of the present invention arranged in a state of transmitted light being emitted within the energy receiver section 12 which is a elected region for condensing the sunlight in accordance with the arrangement location of each said lens.

Figure 8:
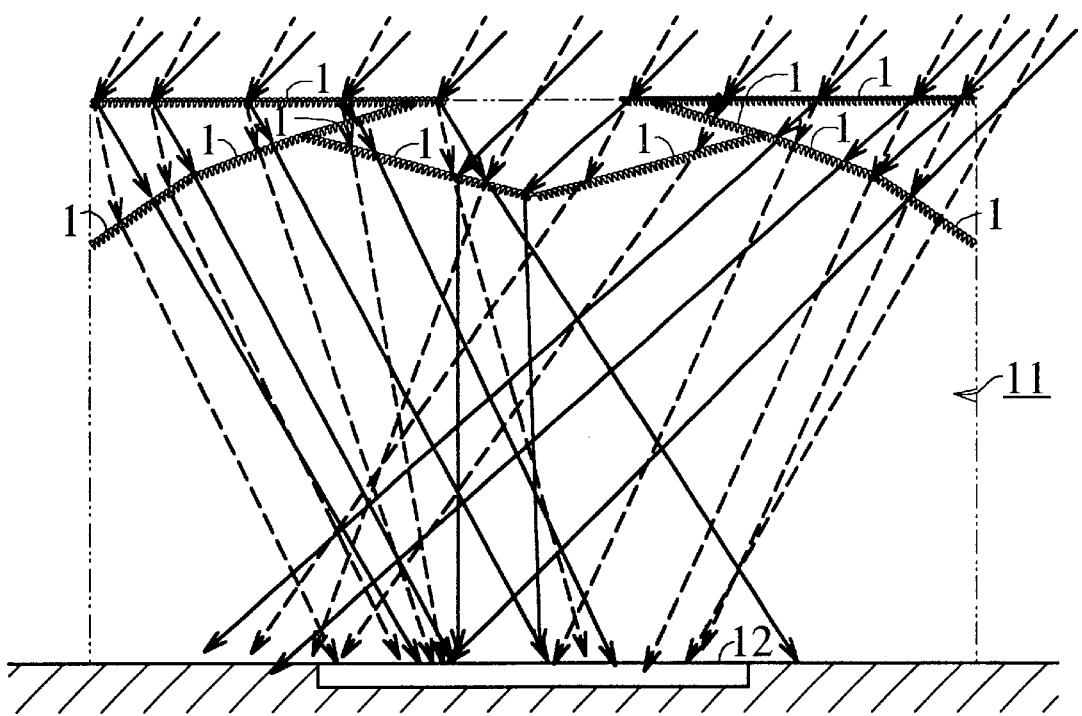
FIGS. 8 to 10 are vertical section views of the condensing light system described in FIG. 7 showing the state of condensing light.
Figure 9:
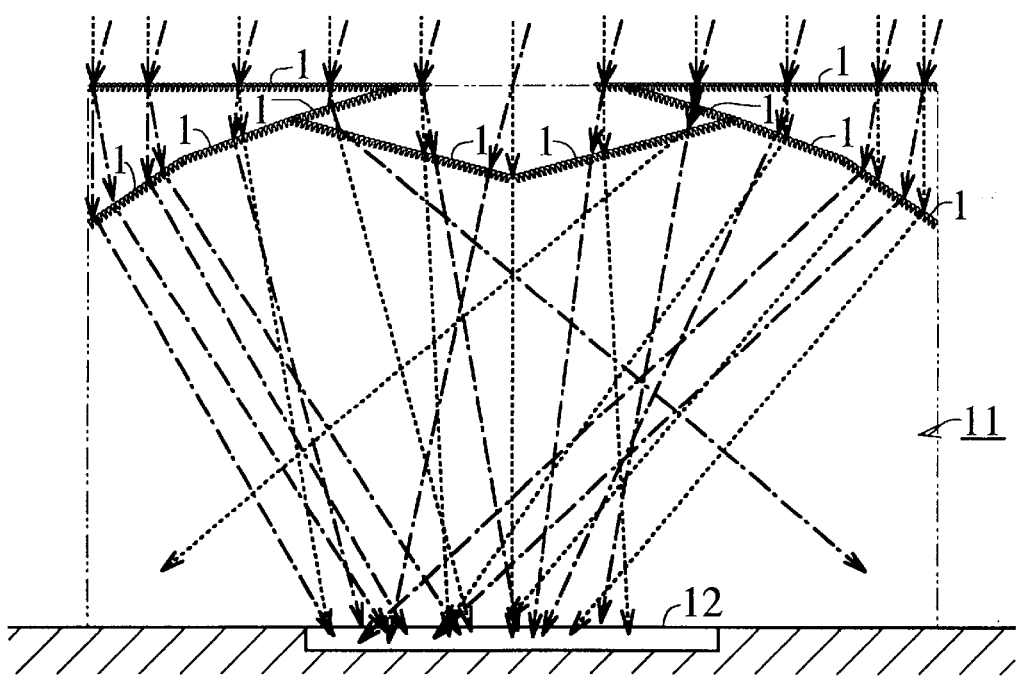

Accordingg to the condensing light system 11, as shown by the arrows in FIG. 8 or 9, almost all of the incident light is condensed within the energy receiver section 12 which is a elected region for condensing the sunlight in spite of the variation of the incidence angle within a fixed region.

Next, I will explain the arrangement of the circumscribing ray route lens 1 of the present invention in the condensing light system 11 in detail. In the condensing light system 11, the circumscribing ray route lens 1 is arranged in three types of states in accordance with each purpose.

The first arrangement state of the circumscribing ray route lens 1 of the present invention comprises plural circumscribing ray route lens 1 of the present invention arranged on the east side and the west side above the elected region for condensing the sunlight with the end on the elected region side being lifted up and the total reflection surface 2f being turned toward the elected region. Therefore, the sunlight which is willing to be irradiated toward east or west out of the energy receiver section 12 is able to be condensed on the energy receiver section 12.

The second arrangement state of the circumscribing ray route lens 1 of the present invention comprises other plural circumscribing ray route lens 1 of the present invention arranged above the lens in the first arrangement state with the total reflection surface 2f being turned toward the elected region. Therefore, the variable region of which the incidence angle of the sunlight incident upon the plural lenses in the first arrangement state is able to be shortened.

The third arrangement state of the circumscribing ray route lens 1 of the present invention comprises other plural circumscribing ray route lens 1 of the present invention arranged right above the energy receiver section 12 with the end on the elected region side being pulled down and the total reflection surface 2f being turned toward the elected region. Therefore, the progress direction of the sunlight incident right above the energy receiver section 12 is able to be made vertically downward.

Figure 10:
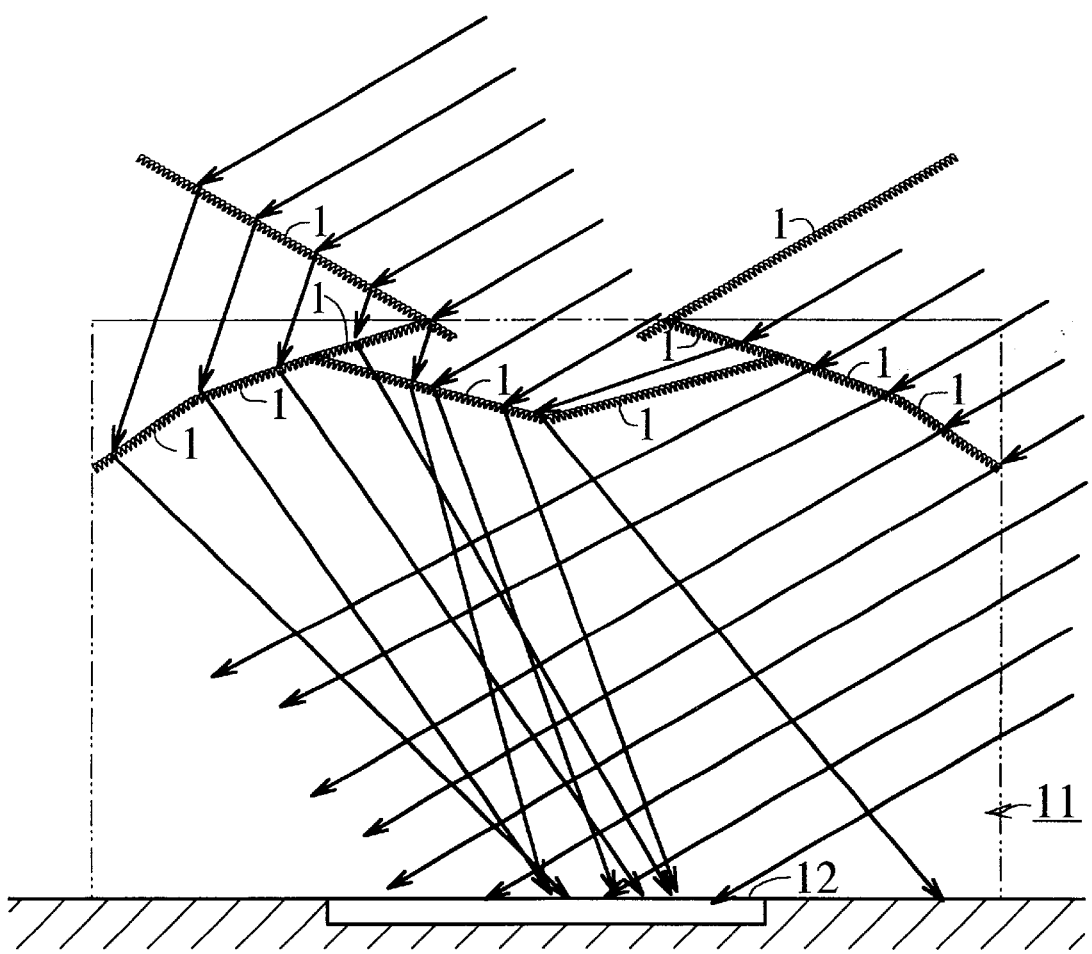

And in case the incidence angle of the sunlight become more large, the end of the lenses in the second arrangement state far from the energy receiver section 12 is lifted up as shown in FIG. 10, and the condensing efficiency of the sunlight is able to be maintained.

Besides, according as the distance between these lenses and the elected region for condensing sunlight becomes too large and the incidence angle becomes more big, it is thought that the light emitted out of the elected region increases more. But, the condensing efficiency of light is able to be prevented from decreasing by adding the helping means 23 shown in FIG. 11.

Figure 11:
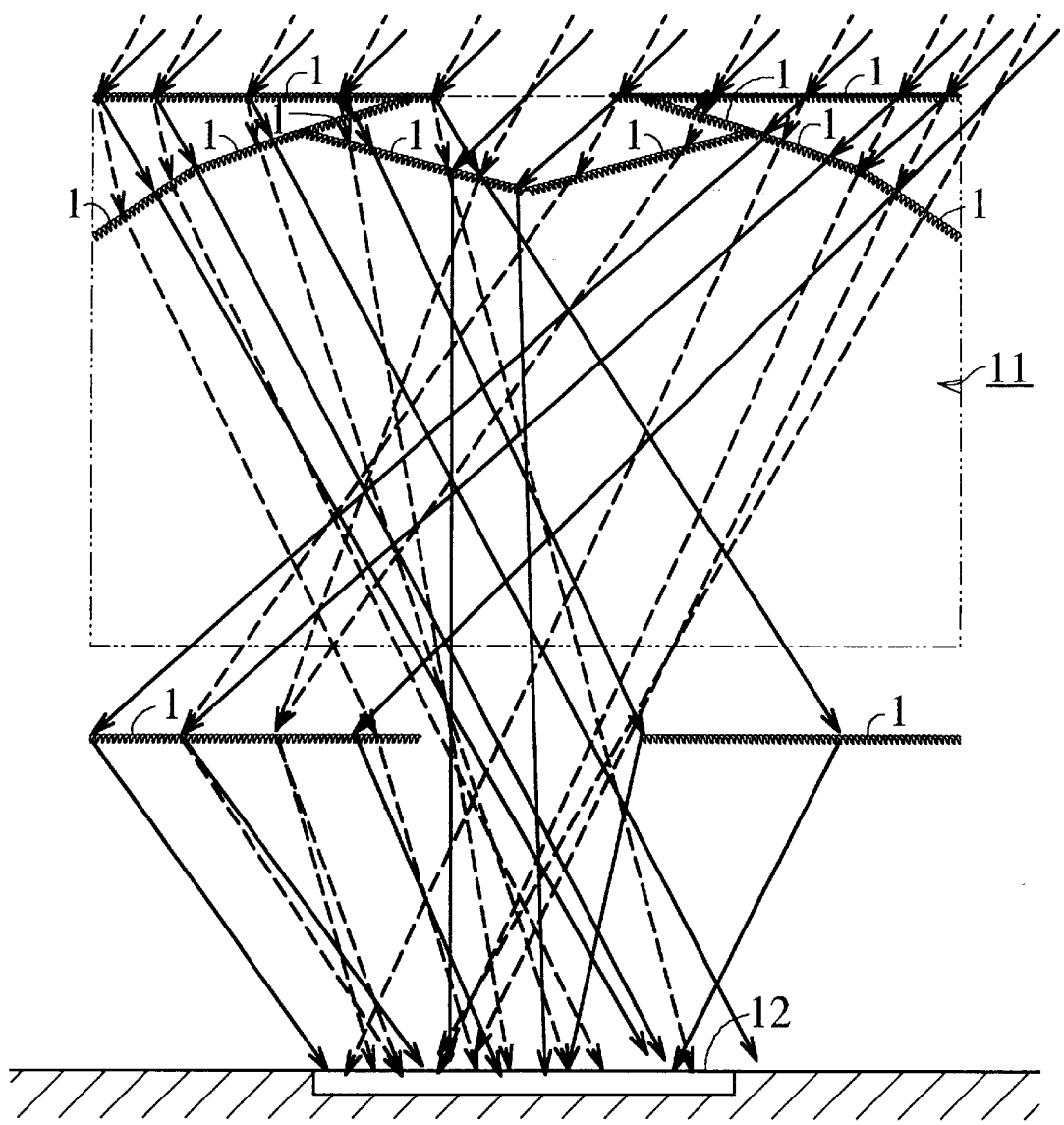
FIG. 11 is a vertical section view of the condensing light system described in FIG. 7 having means for helping condensing light to improve condensing efficiency.

The helping means 23 shown in FIG. 11 is consisted of plural circumscribing ray route lenses 1 of the present invention arranged on the west side or the east side below the lenses in the first arrangement style with the total reflection surface 2f being turned toward the elected region. Therefore, the progress direction of the transmitted light incident out of the elected region is corrected, and the transmitted light can reach within the elected region for condensing light.

Next, the second working configuration of the condensing light system having the circumscribing ray route lens 1 of the present invention will be explained.

Figure 12:
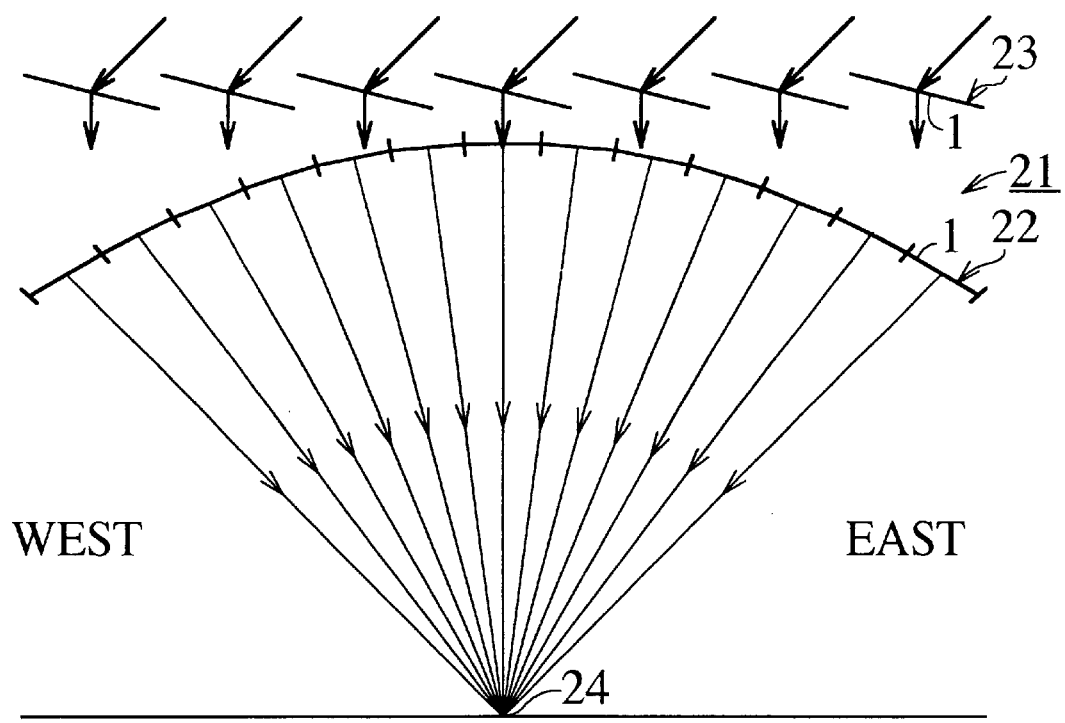
FIGS. 12 and 13 are vertical section views of the second working configuration of the condensing light system having the circumscribing ray route lens of the present invention.
Figure 13:
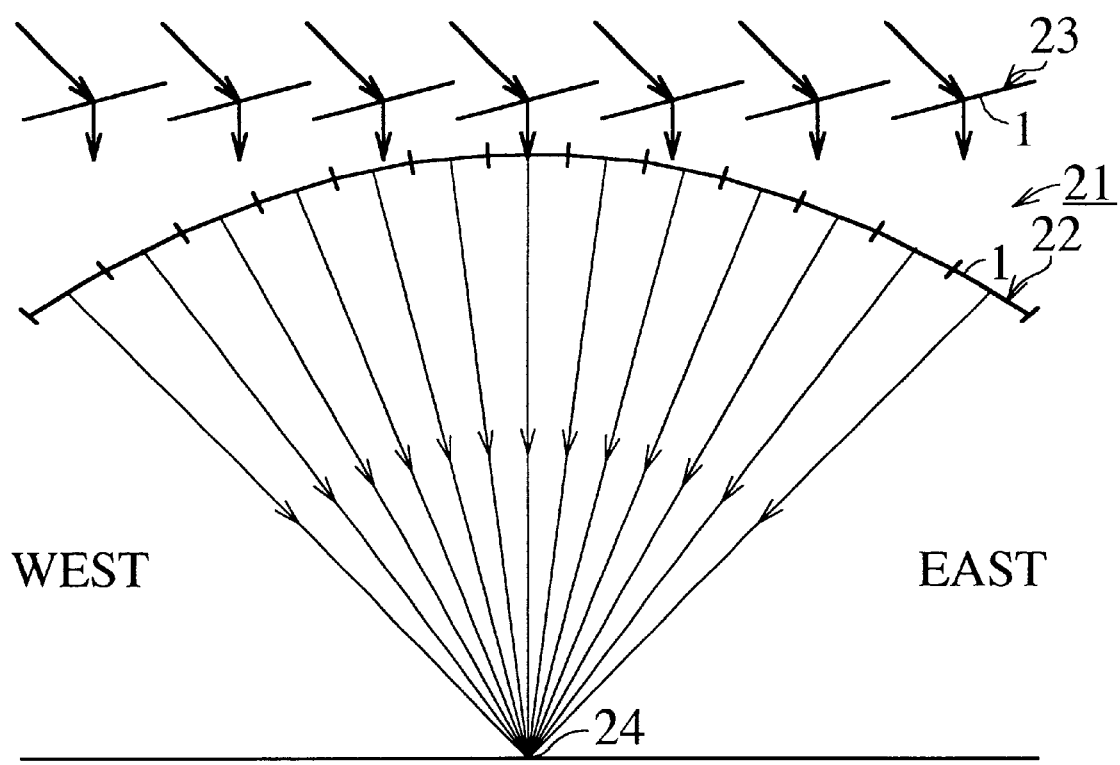

A condensing light system 21 shown in FIG. 12 or 13 is thought for the purpose of condensing sunlight more widely and improving the condensing efficiency.

The condensing light system 21 also comprises plural circumscribing ray route lenses 1 of the present invention arranged in a state of transmitted light being emitted within a the elected region for condensing the sunlight in accordance with the arrangement location of each said lens.

Besides, the condensing light system 21 is characterized by: a condensing light means 22 comprising said plural lenses of the present invention arranged in a state of transmitted light being emitted within a elected region for condensing sunlight in accordance with the arrangement location of each said lens and being convex in shape in case of being looked toward north and south direction in the state as it is; and helping means 23 comprising other plural lenses same as said lens arranged above the condensing light means 22 and having a function to make each lens follow so as to keep the emitting direction of the sunlight transmitted trough the lens vertically downward in case of being looked toward north and south direction.

Therefore, according to the condensing light system 21, the region for condensing sunlight is limited; the sunlight is able to be condensed at a high density.

Further, in the FIG. 12, the inclination angle of the circumscribing ray route lens 1 of the present invention against a horizontal surface is the angle which makes the direction of the sunlight being emitted from the lens vertically downward on condition that the incidence angle is 45 degree unexpectedly, practically speaking, the incidence angle of the sunlight changes momently, thus the helping means 23 has a function to make the inclination angle of each circumscribing ray route lens 1 of the helping means 23 against a horizontal surface change momently.

Figure 6:
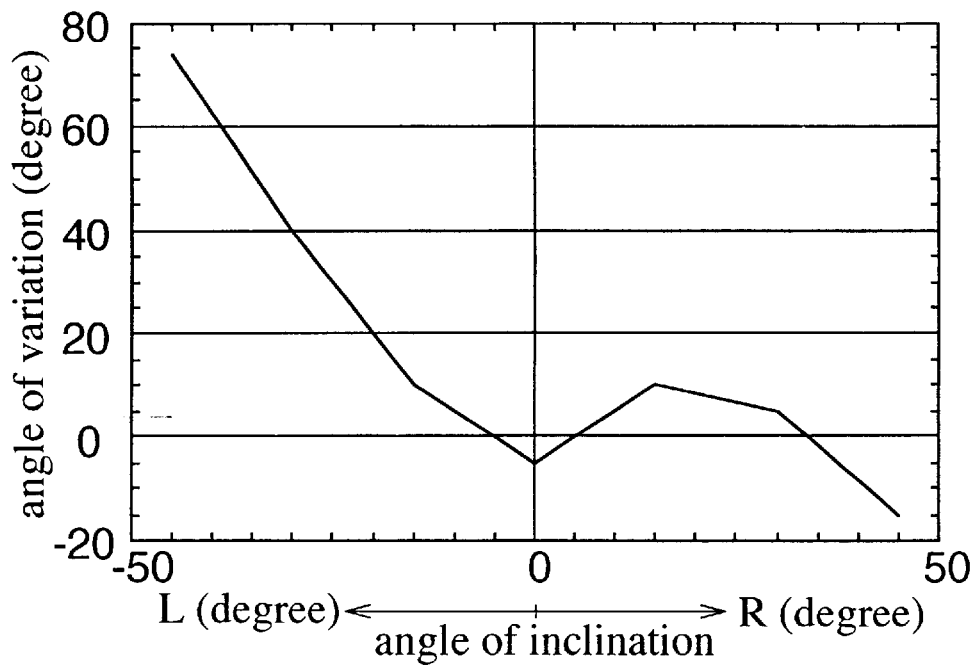
FIG. 6 is a graph of the circumscribing ray route lens of the present invention showing the relation between the inclination angle and variation angle of the lens.

Besides, the inclination angle of each circumscribing ray route lens 1 of the condensing light means 22 against a horizontal surface accords with the incidence angle defined in the explanation as mentioned above. And the angle between the line connected from the condensing point 24 to the center of each circumscribing ray route lens 1 of the condensing light means 22 and a horizontal line: accords with the angle of variation defined in the explanation as mentioned above. Further, the relation between the inclination angle and the angle of variation is shown in FIG. 6. The part shown as R (degree) in FIG. 6 is the region of inclination angle in the morning in FIG. 2, it shows the sunlight incident from right side against this document paper. And the part shown as L (degree) in FIG. 6 is the region of inclination angle in the afternoon in FIG. 2, it shows the sunlight incident from left side against this document paper.

In the condensing light means 22, the circumscribing ray route lens 1 is limited on condition that the direction from which the light is incident is limited from L-side. Each circumscribing ray route lens 1 of the condensing light means 22 is arranged in series symmetrically toward the west-east direction with being connected, and the connection state of the lenses is linearly convex in shape in case of being looked toward north and south direction.

Further, in FIG. 12, the condensing state in the morning is shown, but when the incidence direction of the light changes from the eastside to the west side as in the afternoon, the direction of each helping means 23 points reverses symmetrically toward the west-east direction against in the state in the morning. Therefore, the circumscribing ray route lens 1 of the helping means 23 can keep the progress direction of the light incident upon the condensing light means 22 vertically downward.

According to the condensing light system 21, the direction of the sunlight of which incidence angle against a horizontal surface changes momently is limited to a fixed region by the helping means 23 in spite of the passing time, and the sunlight is able to be irradiated to a condensing light means 22 comprising said plural lenses 1 arranged in a state of transmitted light being emitted within a fixed region in accordance with the arrangement location of each said lens 1, thus the condensing light system 22 is able to be used under the condition which causes the best condensing efficiency. Therefore, the condensing efficiency is able to be improved better than in case of the condensing light system 21 comprising only said condensing light means 22.

Next, I will explain a means for receiving the solar energy condensed by the lighting system having the circumscribing ray route lens 1 of the present invention. For example, the one arranged in the energy receiver section 12 of the condensing light system 11 or the condensing point 24 of the condensing light system 21 will be explained.

As the working configuration for receiving solar energy, a absorbing thermic energy means for absorbing solar energy as thermic energy and a transducing into electric energy means for absorbing solar energy as electric energy and so on are thought.

Figure 14:
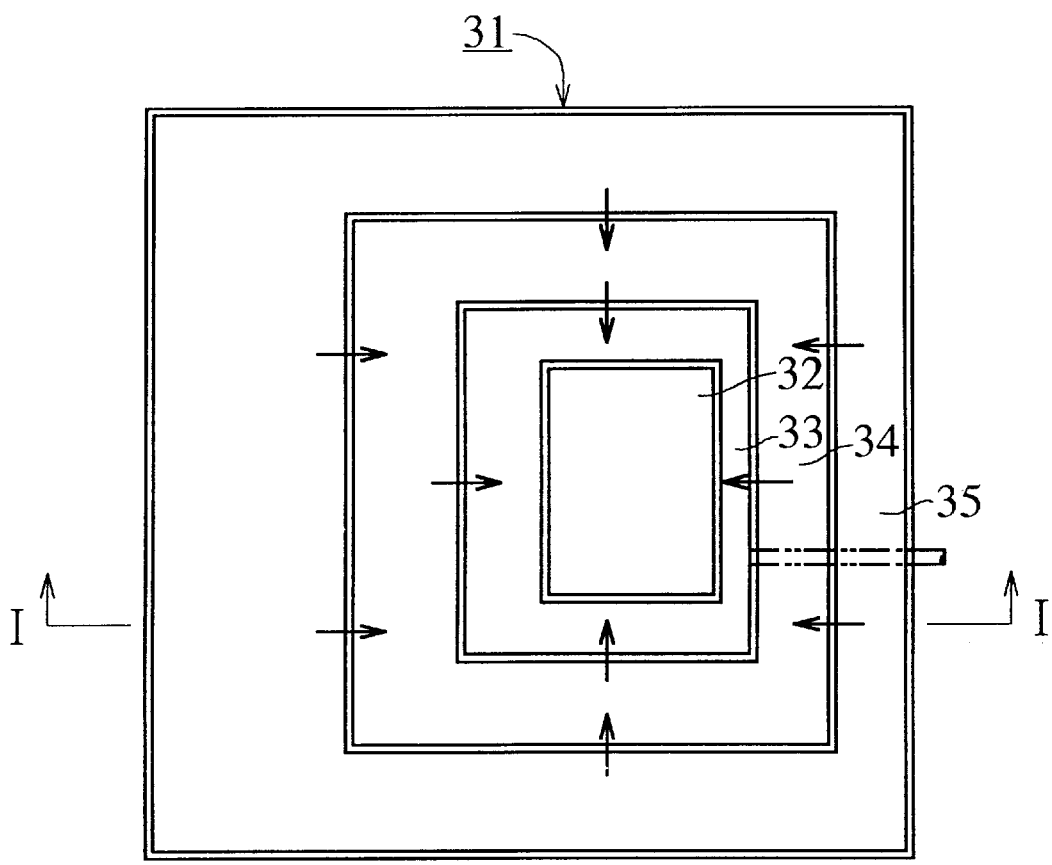
FIG. 14 is a plan view of the first working configuration of the means for absorbing thermic energy used in the condensing light system having the circumscribing ray route lens of the present invention.

First, the working configuration of a absorbing thermic energy means will be explained. FIG. 14 is a plan view of the first working configuration of the means for absorbing thermic energy used in the condensing light system having the circumscribing ray route lens of the present invention; and FIG. 15 is a cross-sectional view taken on line A—A of FIG. 14.

Figure 15:
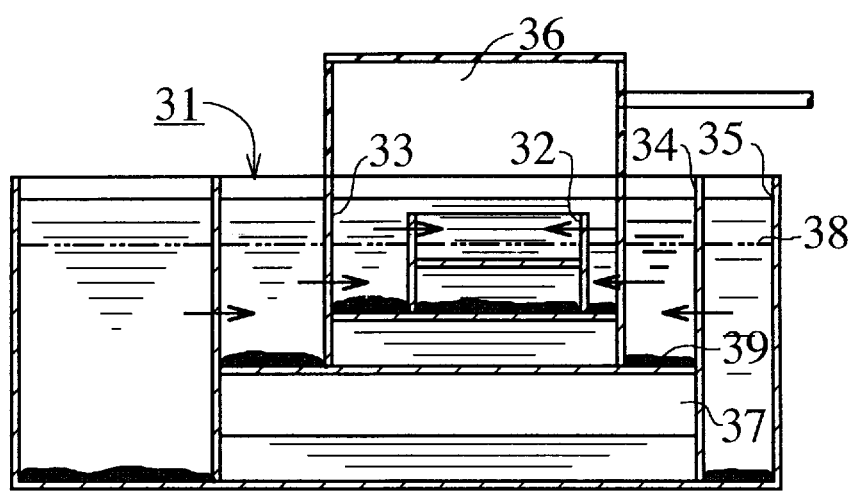
FIG. 15 is a cross-sectional view taken on line A—A of FIG. 14.

As shown in FIG. 14 and FIG. 15, the absorbing thermic energy means 31 is characterized by: a high temperature cistern 32 arranged within the elected region for condensing the sunlight by the light condensing system having the circumscribing ray route lens 1; a preheating cistern divided into three sections (the first preheating cistern 33, the second preheating cistern 34, and the third preheating cistern 35 from inside to outside) which arranged in a low around the high temperature cistern 32. And the preheating cistern supplies liquid responding to the quantity of liquid decreased in the high temperature cistern 32.

According to the thermic energy means 31, the liquid which will be supplied in the high temperature cistern 32 is preheated by solar energy leaked out around the high temperature cistern 32 before reaching the high temperature cistern 32, thus the solar energy leaked out around the high temperature cistern 32 is able to be used to the utmost. Further, as mentioned above, the preheating cistern comprises three cisterns (the first preheating cistern 33, the second preheating cistern 34, and the third preheating cistern 35). Though, the number of the cistern which the preheating cistern comprises is not always limited.

A thermic energy absorber film 38 made up of carbon fiber is arranged between the surface and bottom of the liquid in each cistern, and fine-grained carbon 39 is arranged at the bottom of the liquid in each cistern. Both of the thermic energy absorber film 38 and the fine-grained carbon 39 in the liquid are thermic energy absorber elements made up of a black body. Thus, most of the solar energy irradiated in the liquid are absorbed by the thermic energy absorber film 38 in the liquid, are changed into thermic energy, and are absorbed by the liquid. The sunlight transmitted through the thermic energy absorber film 38 reaches to the fine-grained carbon 39, after that the sunlight are absorbed by the fine-grained carbon 39 in the liquid, are changed into thermic energy, and are absorbed by the liquid similarly.

In this way, the solar energy is absorbed by the liquid through two steps of the thermic energy absorber element to the utmost, thus the thermic energy is prevented from going out to the utmost.

Further, as mentioned above, the thermic energy absorber element comprises both: the thermic energy absorber film 38 made up of carbon fiber; and fine-grained carbon 39. But the thermic energy absorber element does not always comprise the both elements. In brief, the thermic energy absorber element may comprises one of the both elements only. Besides, other elements can afford to be as a thermic energy absorber element if possible.

In addition to this, the absorbing thermic energy means 31 is characterized by a air cistern 37 for keeping the surface of the liquid constant by changing its volume in the liquid in accordance with the volume of the liquid continuing changing.

Therefore, in spite of changing the volume of the liquid accommodated in the cistern irregularly for example as in case of washing something or using hot water in bathing, the liquid surface in the cistern is able to be kept constant by changing the volume of the air cistern, thus the use of the equipment for supplying liquid for example as a pump is able to be decreased to the utmost, and the life of the equipment for supplying liquid is able to be prolonged. Besides, because the liquid surface in the chamber is able to be kept constant within a fixed change of the volume of the liquid as described above, the temperature of the liquid in the chamber is able to be prevented from going down by supplying liquid of the equipment unnecessarily.

In this way, the absorbing thermic energy means 31 of which efficiency for condensing thermic energy is elevated is good for personal hot-water generator, or for boiling solution to enrich and so on.

In case that the absorbing thermic energy means 31 is used for boiling solution, the solution is able to be enriched without exhausting the carbon dioxide and other harmful gas, thus the object is able to be achieved without causing an environmental pollution.

The absorbing thermic energy means 31 has an evaporating cistern 36 which accommodates steam caused by boiling in the high temperature cistern 32.

Therefore, the absorbing thermic energy means 31 is able to be used for various purposes, for example, the steam caused by boiling in the high temperature cistern 32 and accommodated in the evaporating cistern 36 is able to be used in a heating equipment and the other various industry and so on.

Figure 16:
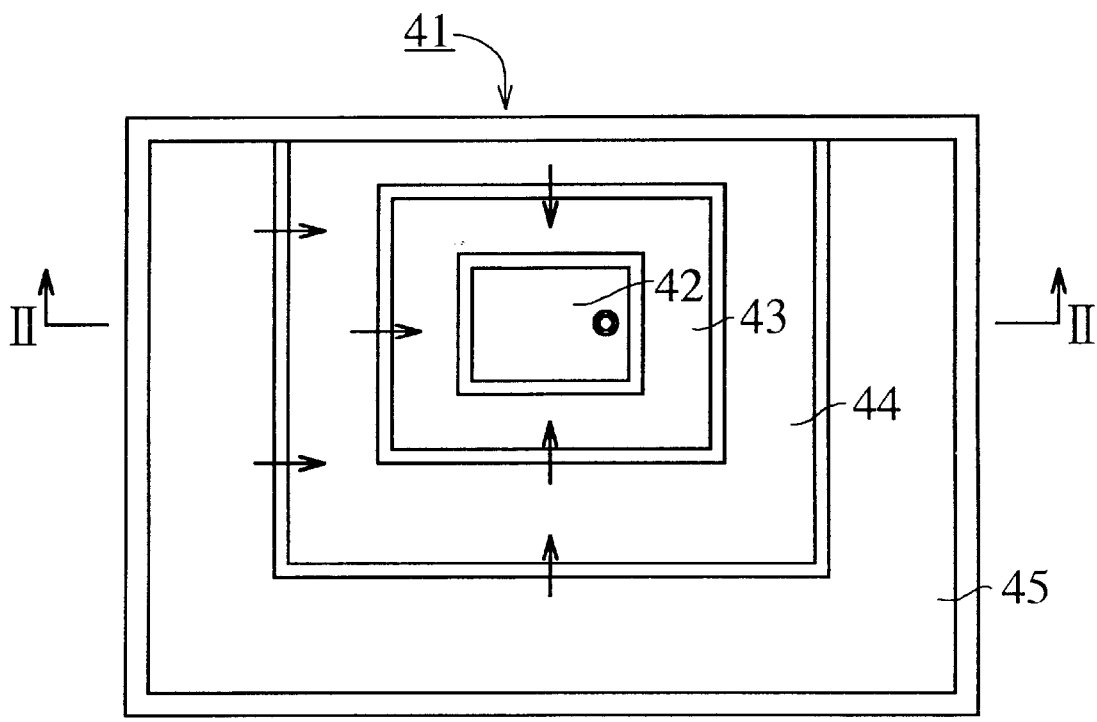
FIG. 16 is a plan view of the second working configuration of the means for absorbing thermic energy used in the condensing light system having the circumscribing ray route lens of the present invention.

Next, the second working configuration of the absorbing thermic energy means used in the condensing light system which has the circumscribing ray route lens 1 of the present invention will be explained. FIG. 16 is a plan view of the second working configuration of the means for absorbing thermic energy used in the condensing light system having the circumscribing ray route lens of the present invention; and FIG. 17 is a cross-sectional view taken on line B—B of FIG. 16.

Figure 17:
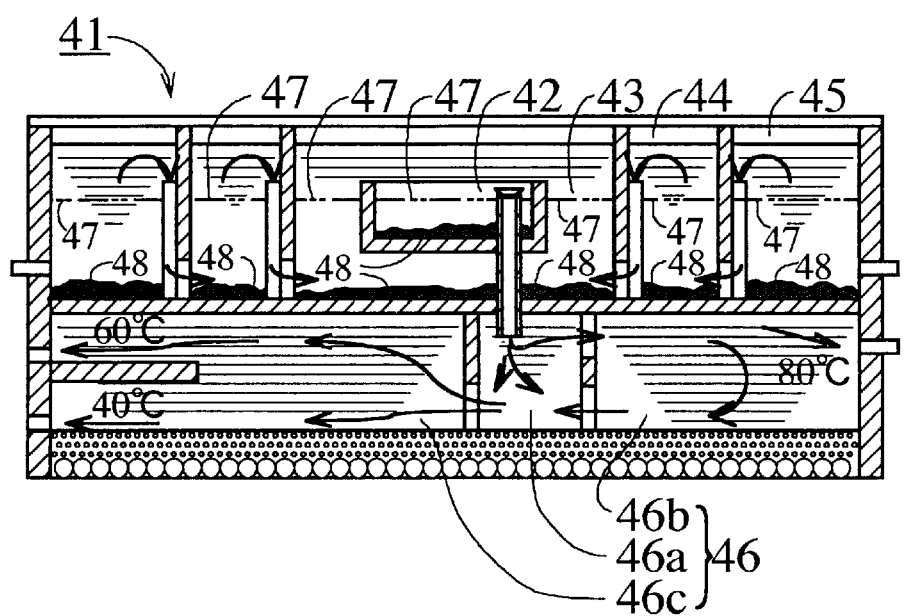
FIG. 17 is a cross-sectional view taken on line B—B of FIG. 16.

As shown in FIGS. 16 and 17, the absorbing thermic energy means 41 is characterized by: a high temperature cistern 42 arranged within the elected region for condensing the sunlight by the light condensing system having the circumscribing ray route lens 1; a preheating cistern divided into three sections (the first preheating cistern 43, the second preheating cistern 44, and the third preheating cistern 45 from inside to outside) which arranged in a low around the high temperature cistern 42. And the preheating cistern supplies liquid responding to the quantity of liquid decreased in the high temperature cistern 42. These contents of the absorbing thermic energy means 41 is common in the absorbing thermic energy means 31. In addition to this, the absorbing thermic energy means 41 has a separating means 46 to separate the heated liquid in accordance with the temperature under the plural cistern as mentioned above.

Besides, a thermic energy absorber film 47 made up of carbon fiber is arranged between the surface and bottom of each cistern of the absorbing thermic energy means 41 also, and similarly fine-grained carbon 48 is arranged at the bottom of each cistern. The solar energy irradiated in the liquid is absorbed by the liquid as thermic energy through these thermic energy absorber elements.

Further, the absorbing thermic energy means 41 does not have the evaporating cistern 36 and the air cistern 37 of the absorbing thermic energy means 31, though, the absorbing thermic energy means 41 can afford to have the evaporating cistern 36 and the air cistern 37.

The separating means 46 comprises: the first separating cistern 46a arranged at the center of the separating means 46; a cistern 46b for separating the highest temperature part, and a cistern 46c for separating the lowest temperature part arranged in series with the first separating cistern 46a being arranged between them. The high temperature cistern 42 and the first separating cistern 46a are connected by a pipe 42a, thus the liquid in the high temperature cistern 42 flows into the first separating cistern 46a through the pipe 42a.

On both the upper point and the lower point of the wall which separates the cistern into the first separating cistern 46a and the cistern 46b for separating the highest temperature part, a hole is made respectively, thus, by a convection of liquid temperature difference, the hotter part of the liquid flows from the first separating cistern 46a to the cistern 46b for separating the highest temperature part through the upper hole of the wall, and the lower part of the liquid in the cistern 46b reverses from the cistern 46b to the first separating cistern 46a through the lower hole of the wall.

On the other hand, on the wall which separates the cistern into the first separating cistern 46a and the cistern 46c for separating the lowest temperature part, a hole is made only at lower point, and through this hole the lower part of the liquid flows from the first separating cistern 46a to the cistern 46c by a convection of liquid temperature difference.

In brief, the first separating cistern 46a is a place for separating the liquid into two states (hotter part and lower part). And the cistern 46b is a place for separating the hotter part of the liquid separated in the first separating cistern 46a into hotter part and lower part again. Similarly, the cistern 46c is a place for separating the lower part of the liquid separated in the first separating cistern 46a into hotter part and lower part again.

Figure 18:
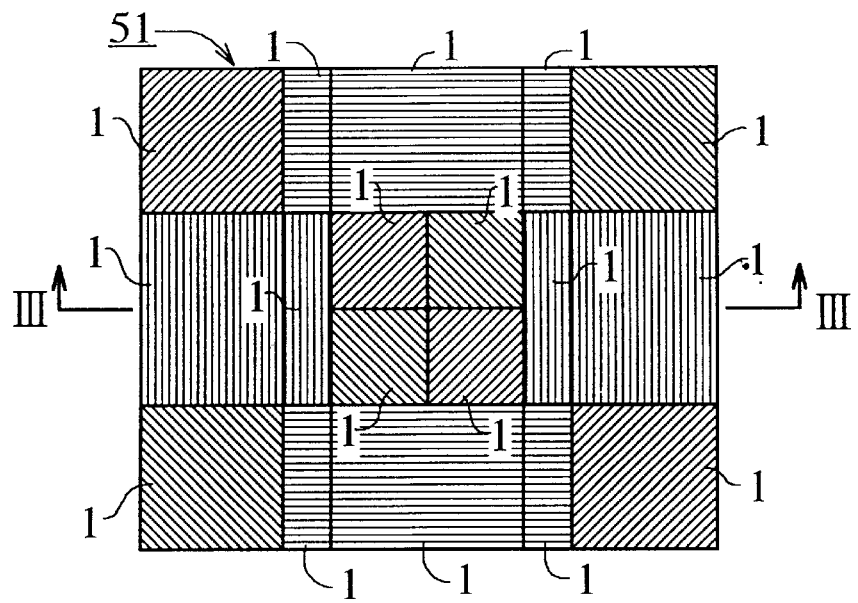
FIG. 18 is a plan view of the third working configuration of the condensing light system having the circumscribing ray route lens of the present invention.

Next, the third working configuration of the absorbing thermic energy means used in the condensing light system which has the circumscribing ray route lens 1 of the present invention will be explained. FIG. 18 is a plan view of the third working configuration of the condensing light system having the circumscribing ray route lens of the present invention; and FIG. 19 is a partly left out cross-sectional view taken on line C—C of FIG. 18.

Figure 19:
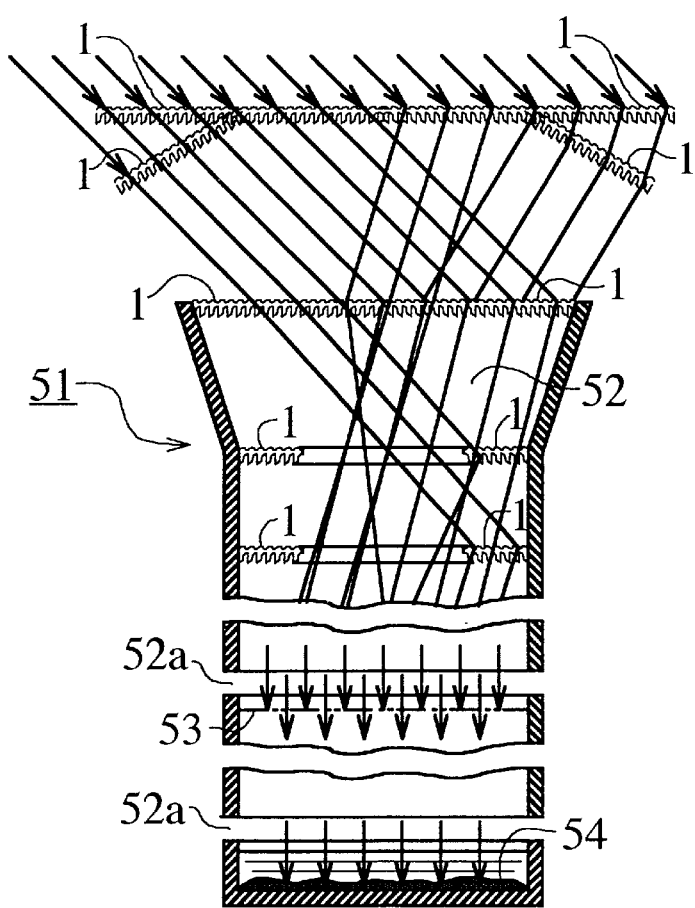
FIG. 19 is a partly left out cross-sectional view taken on line C—C of FIG. 18.

As shown in FIG. 18 and 19, in the condensing light system 51 as in each condensing light system mentioned above, plural circumscribing ray route lenses 1 of the present invention are arranged in a state of transmitted light being emitted within a the elected region for condensing the sunlight in accordance with the arrangement location of each said lens.

Besides, in the condensing light system 51 as in the condensing light system 11 mentioned above, plural circumscribing ray route lenses 1 of the present invention are arranged on the east side and the west side above the elected region for condensing the sunlight with the end on the elected region side being lifted up and the total reflection surface 2f being turned toward the elected region.

Especially, in the condensing light system 51, the progress direction of almost all the rays of condensed light of which incidence angle are various is limited vertically downward by means of other plural lenses same as said lens arranged in plural layers in series with the elected region for condensing the sunlight, and the condensed light is lead to a ray route 52 vertically draughty. In the ray route 52, the air heated through a thermic energy absorber film 53 as a thermic energy absorber element made up of a black body like carbon fiber by the condensed light: of which the progress direction is limited vertically downward; lead in a ray route vertically draughty. During this, chimney effect is happened, and an air exhauster is made by the chimney effect.

Further, lower side of the ray route 52, an air inlet 52a is arranged, thus the air indoors is able to be exhausted by letting into the ray route 52 through the air inlet 52a.

Besides, at the lowest end of the ray route 52 of the condensing light system 51, fine-grained carbon 54 as a thermic energy absorber element made up of a black body is arranged in the liquid to absorb the solar energy of the transmitted sunlight, in this way the third working configuration of a absorbing thermic energy means is composed.

Figure 20:
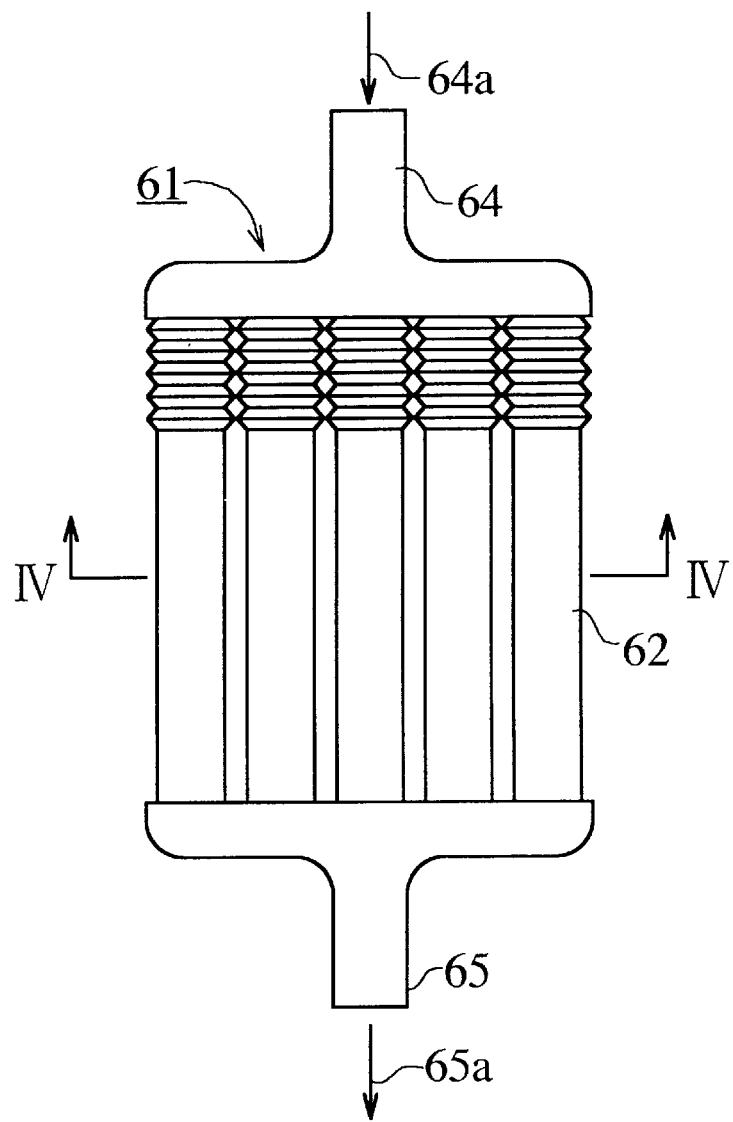
FIG. 20 is a plan view of the fourth working configuration of the means for absorbing thermic energy used in the condensing light system having the circumscribing ray route lens of the present invention.

Next, the fourth working configuration of a absorbing thermic energy means of the condensing light system having the circumscribing ray route lens 1 of the present invention will be explained. FIG. 20 is a plan view of the fourth working configuration of the means for absorbing thermic energy used in the condensing light system having the circumscribing ray route lens of the present invention; and FIG. 21 is a enlarged cross-sectional view taken on line D—D of FIG. 20.

Figure 21:
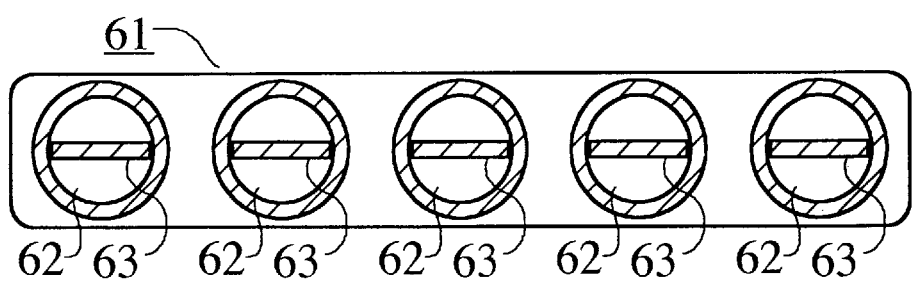
FIG. 21 is an enlarged cross-sectional view taken on line D—D of FIG. 20.

The absorbing thermic energy means 61 shown in FIG. 20 and 21 is used by arranged within a elected region for condensing the sunlight of the condensing light system having the circumscribing ray route lens 1 of the present invention, and absorbs the solar energy as thermic energy. In detail, the absorbing thermic energy means 61 is characterized by: a chamber 62 made up of transparent material; and a thermic energy absorber element 63 made up of a black body like carbon fiber. The chamber 62 has an air inlet 64 to let the air flow in as shown by arrow 64a and an air outlet 65 to let the air flow out as shown by arrow 65a, thus the chamber 62 has a structure that air can pass through inside.

By the way, as mentioned above, the means to receive solar energy is the absorbing thermic energy means which receives solar energy as thermic energy, however, the means to receive solar energy is able to be a means for transducing into electric energy like a solar cell for absorbing solar energy as electric energy.

In case the means to receive solar energy is a means for transducing into electric energy, the generated electric energy increases in accordance with the increase of the received light by condensing, so the quantity of light which the means for transducing into electric energy receives is able to increase more cheaply than in case of increasing the means for transducing into electric energy, and the cost of solar equipment per quantity of generated electric energy is able to go down.

Figure 22:
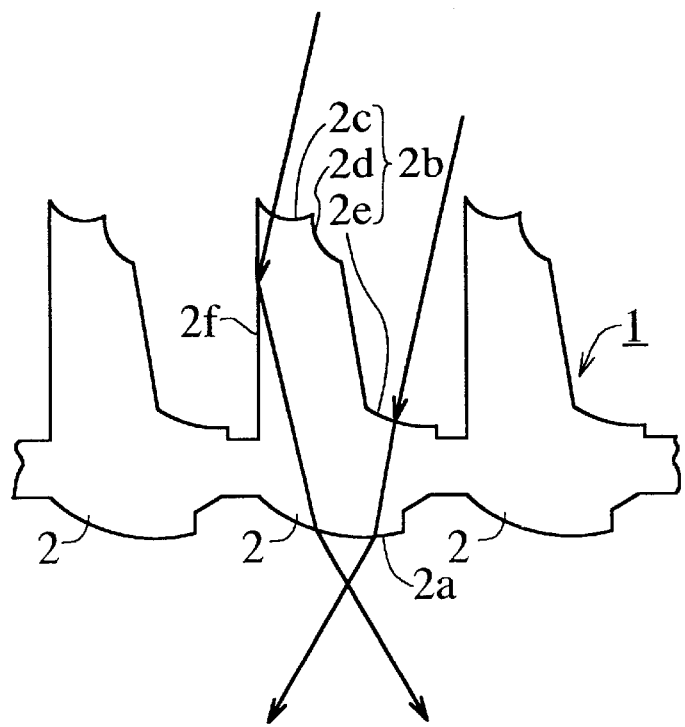
FIG. 22 is a diagram showing the theory of light's dispersion by the circumscribing ray route lens of the present invention.

Next, the lighting by the circumscribing ray route lens 1 of the present invention will be explained. As mentioned above, the circumscribing ray route lens 1 of the present invention is used as a means for condensing light, however, it is able to be used as a means for scattering light conversely. In brief, in the circumscribing ray route lens 1 of the present invention, the light is able to be emitted from the ray receiver surface 2a by means of exchanging the incidence direction for emitting direction as shown in FIG. 22.

Figure 23:
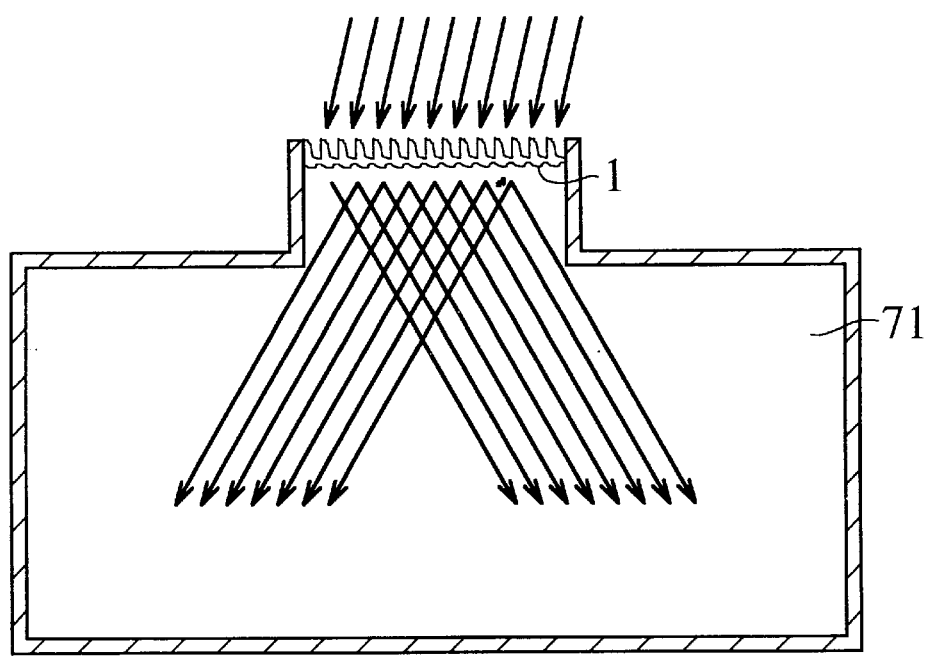
FIG. 23 is a diagram showing the lighting using the theory of light's dispersion by the circumscribing ray route lens of the present invention.

In case the circumscribing ray route lens 1 of the present invention is used with exchanging the incidence direction for emitting direction as mentioned above, the part of the light incident upon the side from which the light is usually emitted is emitted from the ray receiver surface 2a after the process of the total reflection by the total reflection surface 2f, and the other part of the light incident upon the side from which the light is usually emitted is incident upon the transmitted light emitter surface 2b and is emitted from the ray receiver surface 2a directly without reflected totally, thus progress direction of the light incident from a fixed direction is separated into two different directions, therefore a parallel ray of light is able to be dispersed. Besides, the loss during the light is transmitted is able to be decreased much better than in case of using a frosted glass which scatters the light toward the irregular directions. Therefore, as shown in FIG. 23, this way of lighting is suitable for a skylight to lead the sunlight indoors very much. In this way, in case the circumscribing ray route lens 1 of the present invention is used as a skylight with exchanging the incidence direction for emitting direction, the sunlight is able to be dispersed into the room 71 almost without decreasing, thus the best environment indoors is able to be provided.

Figure 24:
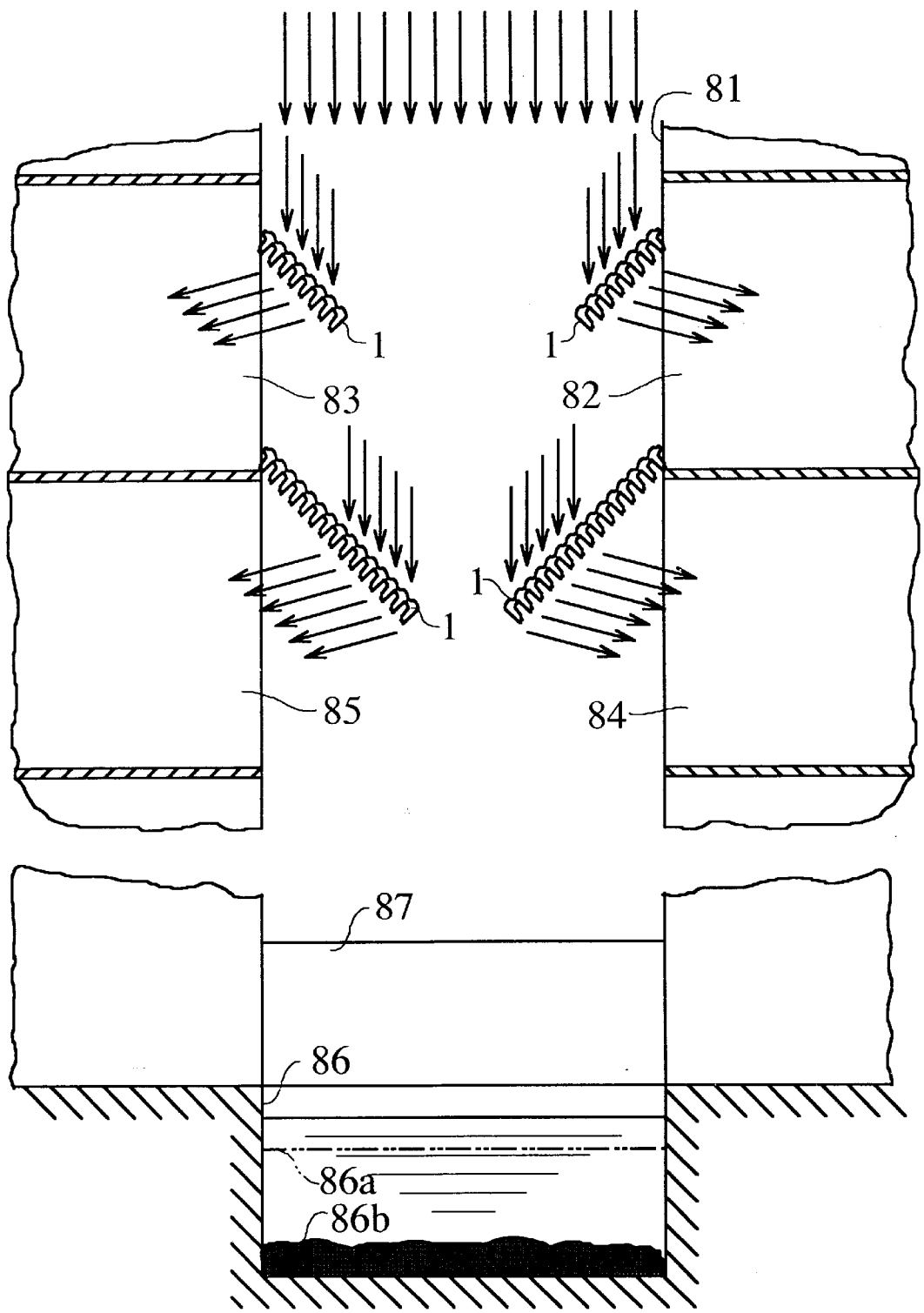
FIG. 24 is a diagram showing light condensed by the circumscribing ray route lens of the present invention being supplied to every room of a plural-story building.

In addition to this, as shown in FIG. 24, the sunlight condensed by the condensing light system having the circumscribing ray route lens 1 of the present invention can afford to be lead in a ray route 81 draughty through every floor of a building of plural stories, and some part of the light lead in the ray route 81 can afford to be lead in every room 82, 83, 84, 85 of each floor of the building in accordance with the necessity by means of other plural lenses same as said lens.

If the sunlight condensed by the circumscribing ray route lens 1 of the present invention is lead as mentioned above, the sunlight is able to be lead to every room of a building of plural stories, thus the lighting indoor is able to be cut down to the utmost.

Further, as mentioned above, the circumscribing ray route lens 1 is used as a means for leading the light from the ray route 81 to the room 82, 83, 84, 85 of each floor, however, the circumscribing ray route lens 1 is not always limited to use as such means. For example, a board for reflecting like a mirror can afford to be used as such means for leading the light. However, it is better to use the circumscribing ray route lens 1 as such means for leading the light, because the progress direction of the light is able to be changed with total reflection and the loss of the solar energy between before and after of reflection is able to be cut down.

Besides, in this lighting same as in case of the condensing light system 51 shown in FIG. 18 and 19, it is OK to have a cistern 86 at the end of the ray route 81, thus the solar energy which reaches to the lower end of the ray route 81 without being lead to any room of the building is able to be absorbed in the cistern 86. In case of having a cistern 86 at the end of the ray route 81, it is OK to arrange thermic energy absorber elements like a thermic energy absorber film 86a made up of carbon fiber or fine-grained carbon 86b in the liquid. Besides, if the evaporating cistern 87 which accommodates hot air with much steam made in the cistern 86 is arranged, hot air suitable for giving to each room is able to be made by getting rid of water from the wet air by calcium chloride and so on, thus the heating equipment is able to be provided.

Figure 25:
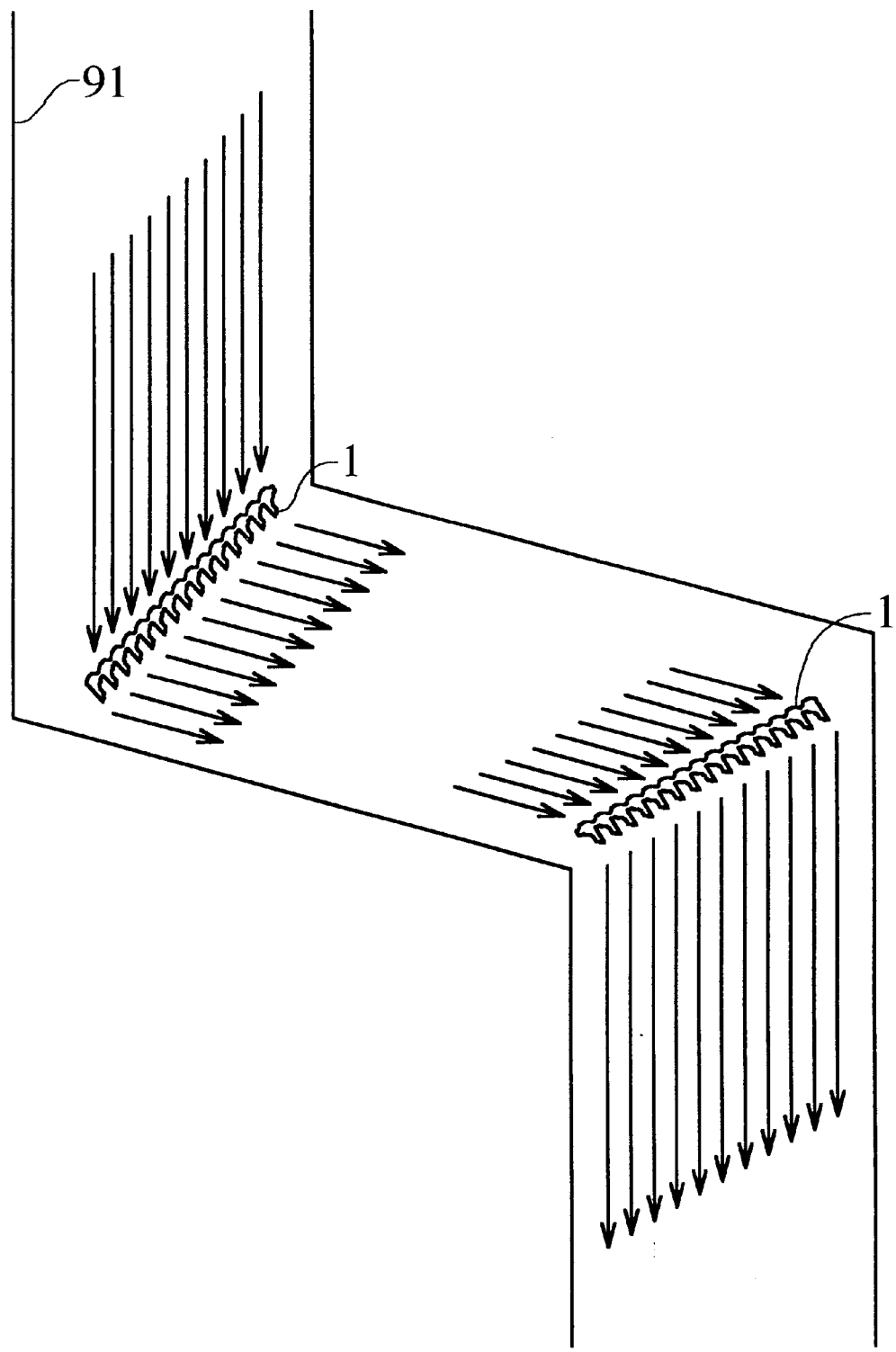
FIG. 25 is a diagram showing light condensed by the circumscribing ray route lens of the present invention being changed direction along a ray route.

Further, the circumscribing ray route lens 1 of the present invention can afford to be arranged at the bended points of the ray route 91 as shown in FIG. 25, thus the progress direction of the light is able to get along the ray route 91 with being changed at the bended points of the ray route 91.

If the circumscribing ray route lens 1 of the present invention is arranged at the bended points of the ray route 91, and the progress direction of the light is able to get along the ray route 91 with being changed at the bended points of the ray route 91, the progress direction of the light going along the ray route 91 is changed at the bended points of the ray route 91 by total reflection, thus the loss of the solar energy between before and after of reflection is able to be cut down much better than in case of using a mirror.

Figure 26:
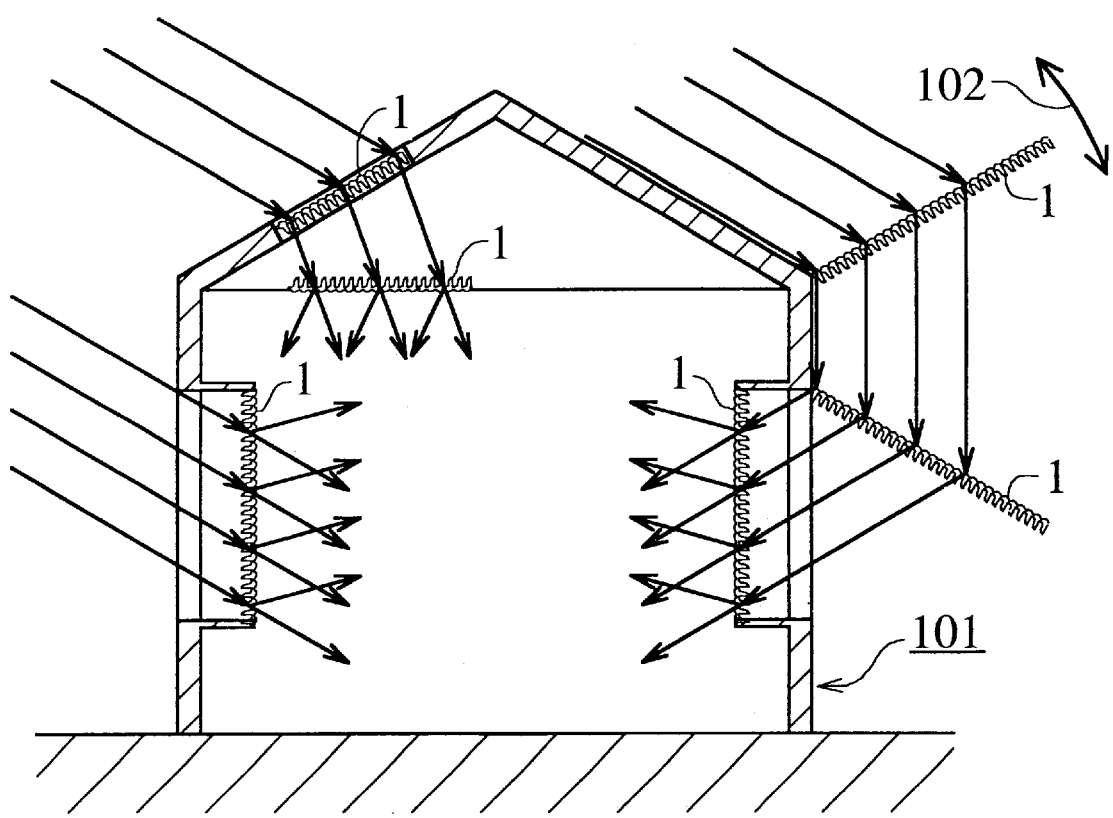
FIG. 26 is a diagram showing the practical application example of lighting using the circumscribing ray route lens of the present invention.

Next, the practical application example of lighting using the circumscribing ray route lens of the present invention will be shown. FIG. 26 is a diagram showing the practical application example of lighting using the circumscribing ray route lens of the present invention.

FIG. 26 is a vertically section view of the house arranged with lighting means of the circumscribing ray route lens 1 of the present invention being looked from east toward west in Northern Hemisphere. As shown in FIG. 26, the circumscribing ray route lens 1 of the present invention is arranged in the state of the incidence direction being exchanging for emitting direction at each of the south window, skylight, and north window of the house 101. In addition to this, at the north window, the direct sunlight from south is also lead by changing the ray route with other circumscribing ray route lenses 1.

Besides, the angle of the circumscribing ray route lens 1 for leading the direct sunlight from south to the north window is changeable as shown by the arrow 102, thus the lighting from the north window is able to be maintained all year long.

Figure 27:
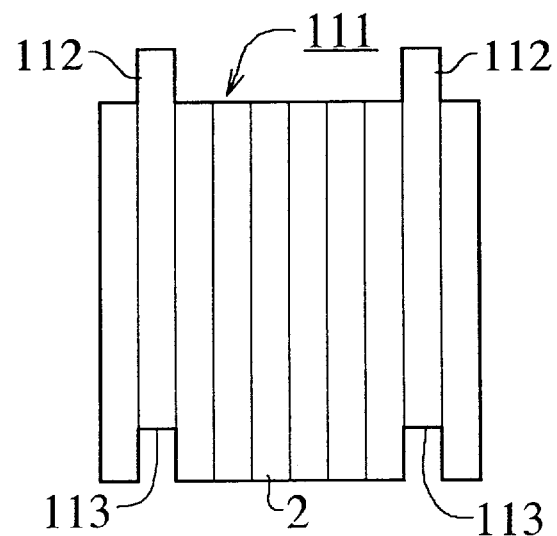
FIG. 27 is a plan view of the first working configuration of the sectional element made up of divided part of the circumscribing ray route lens of the present invention.
Figure 28:
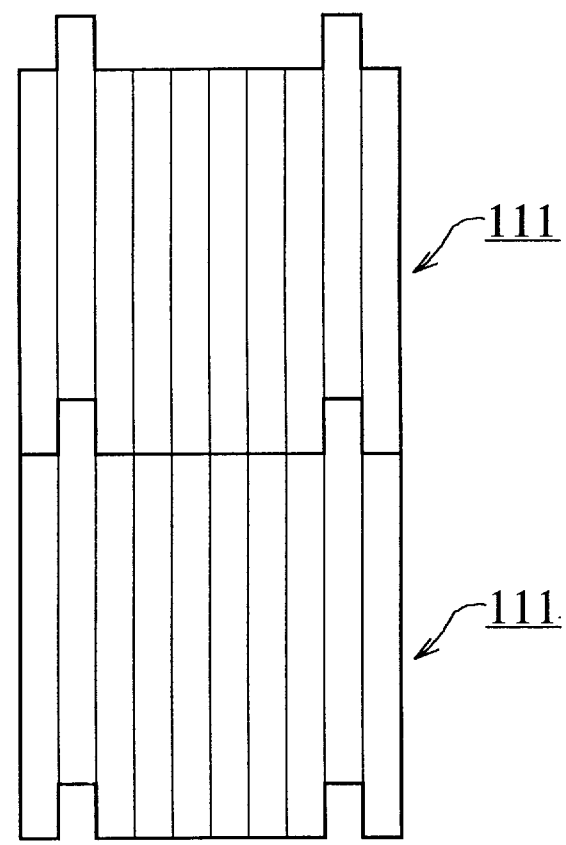
FIG. 28 is a plan view showing the plural sectional elements in FIG. 27 being combined.

By the way, whole of the circumscribing ray route lens 1 of the present invention can afford to be made in a body, however, the circumscribing ray route lens 1 of the present invention can afford to be divided into plural sections. FIG. 27 is a plan view of the first working configuration of the sectional element made up of divided part of the circumscribing ray route lens 1 of the present invention; and FIG. 28 is a plan view showing the plural sectional elements in FIG. 27 being combined.

The sectional element 111 shown in FIG. 27 is one of the divided sections square in shape. In the sectional element 111, circumscribing ray route section 2 is parallel to one of the side of the square. Besides, a coupling male portion 112 is made one side of the sectional element 111, a coupling female portion 113 is made the other side of the sectional element 111, thus, as shown in FIG. 28, plural sectional elements 111 is able to be connected with each coupling male portion 112 being inserted to responding coupling female portion 113. Therefore, various sizes of the circumscribing ray route lens 1 are able to be made.

Figure 29:
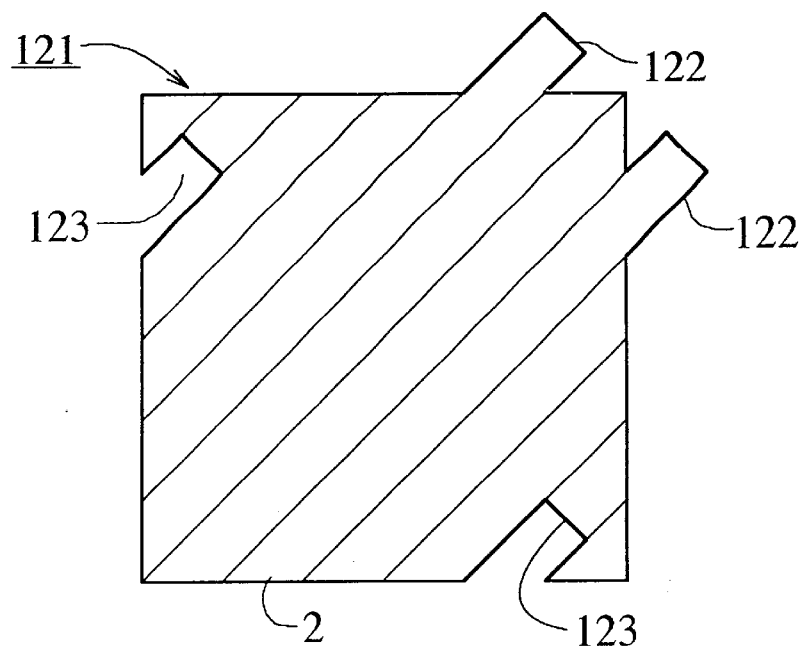
FIG. 29 is a plan view of the second working configuration of the sectional element made up of divided part of the circumscribing ray route lens of the present invention.
Figure 30:
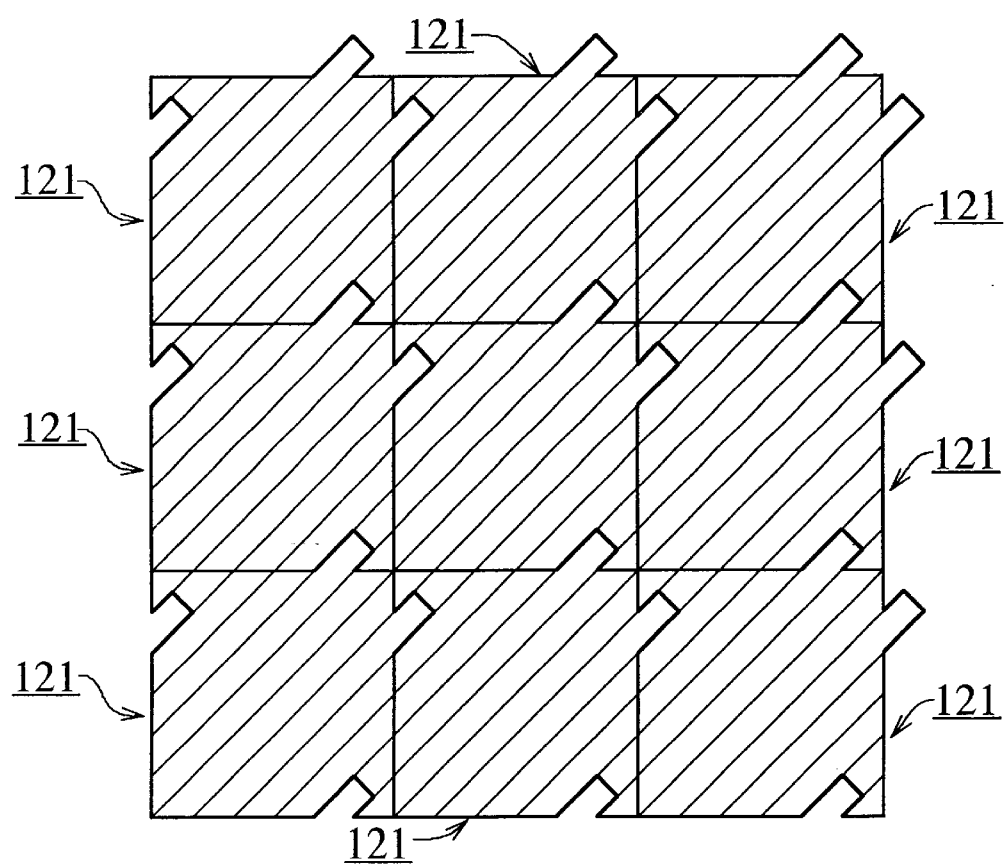
FIG. 30 is a plan view showing the plural sectional elements of FIG. 29 being combined.

Further, in the divided section of the circumscribing ray route lens 1, circumscribing ray route section 2 is not always parallel to the side of the section. In brief, the circumscribing ray route section 2 can afford to be inclined against the side of the sectional element 121 shown in FIG. 29 and 30. As a matter of course, both of the coupling male portion 122 and the coupling female portion 123 which is connected to the coupling male portion 122 can afford to be inclined against the side of the sectional element 121. FIG. 29 is a plan view of the second working configuration of the sectional element made up of divided part of the circumscribing ray route lens of the present invention; and FIG. 30 is a plan view showing the plural sectional elements of FIG. 29 being combined.

Figure 31:
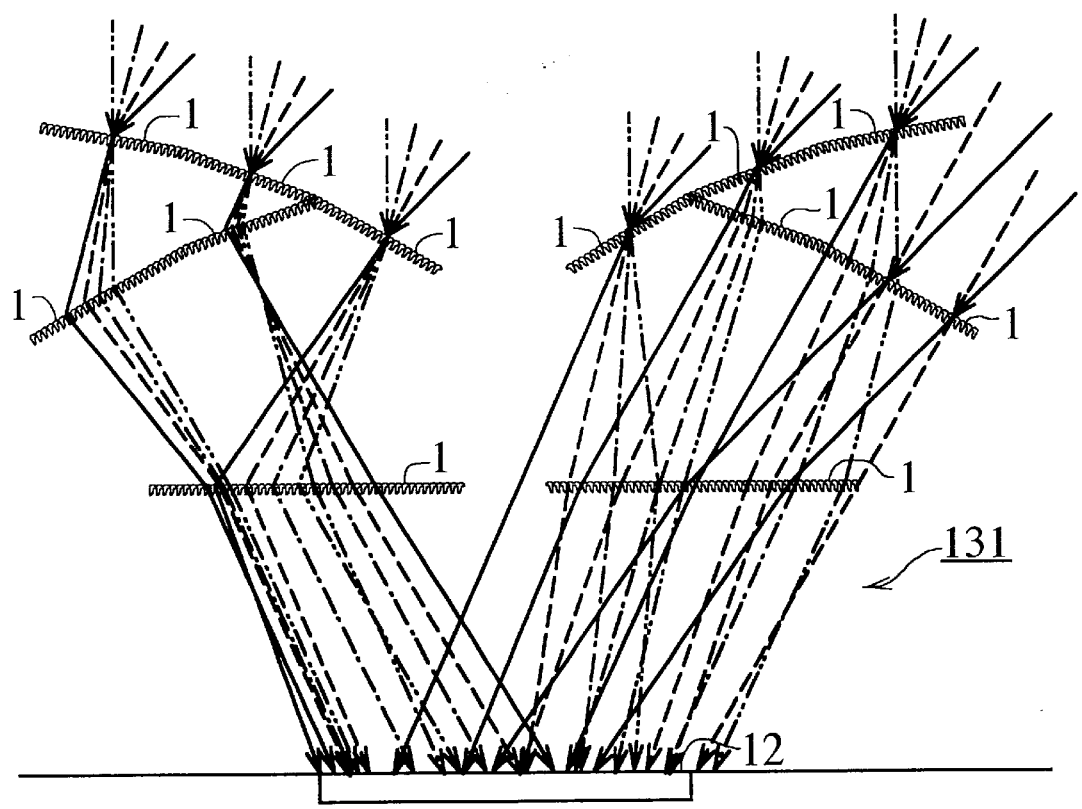
FIG. 31 is a vertical section view of the condensing light system of FIG. 11 of which the mechanism is simplified.

By the way, as mentioned above, in the first working configuration of the condensing light system 11 shown in FIG. 7 through 11, the end of the lenses in the second arrangement state far from the energy receiver section 12 is lifted up, and the condensing efficiency of the sunlight is able to be maintained, however, the direction and the location of each circumscribing ray route lens 1 is not always changed. For example, in case plural circumscribing ray route lenses 1 are arranged in the state of the location and the direction as shown in 31 and the condensing light system 131 is made, in spite of all the circumscribing ray route lenses 1 are fixed, the sunlight is able to be condensed within the energy receiver section 12 which is the elected region for condensing the sunlight under the same condition of the incidence angle as in case of the condensing light system 11. Further, the arrows in the FIG. 31 show the progress routes of the main incident light.

Besides, as mentioned above, the point of each condensing light system against the variation of the incidence angle which changes momently from sunrise to sunset is described mainly, however, each condensing light system can afford to have a function against the variation during the four seasons.

Figure 32:
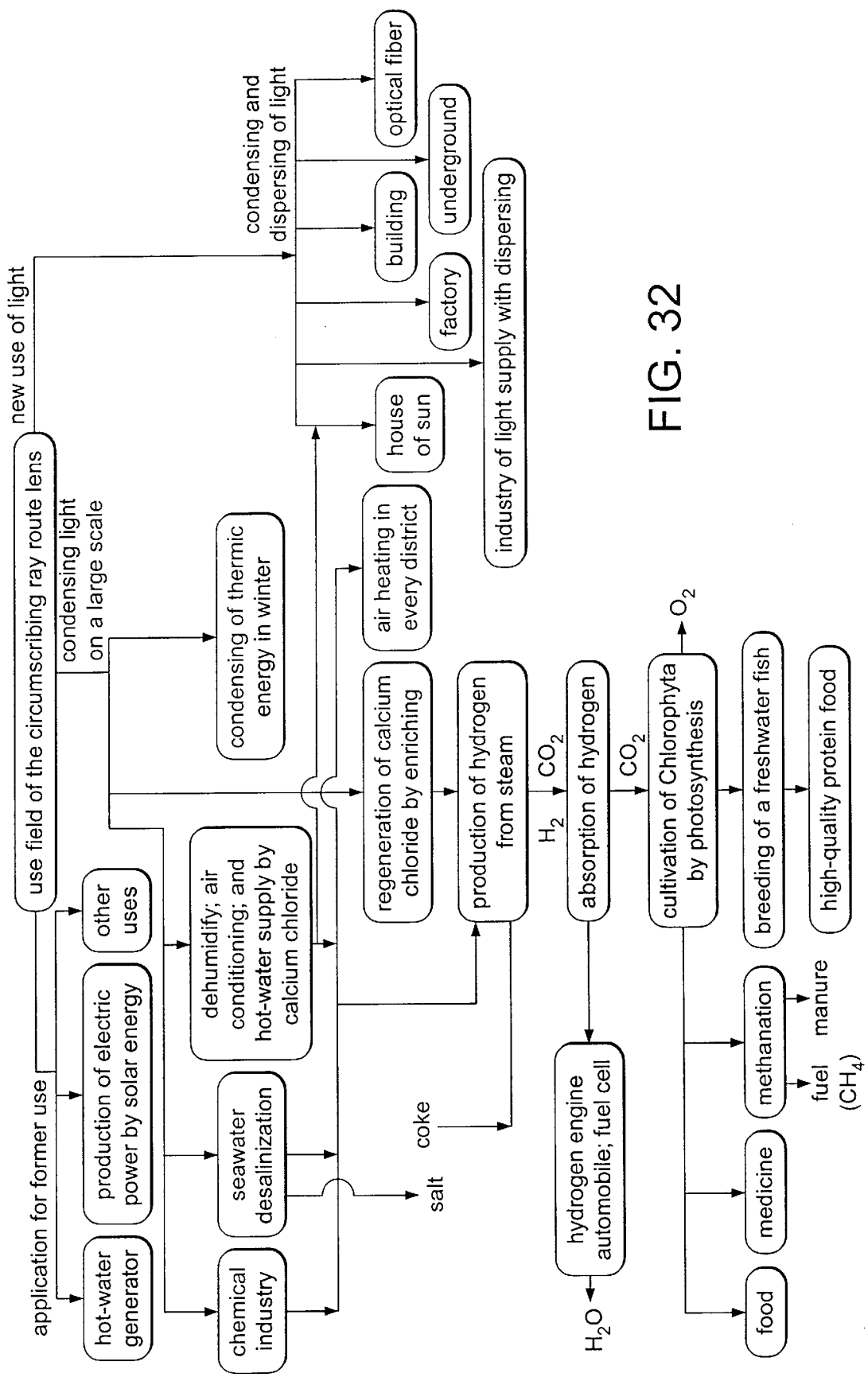
FIG. 32 is a diagram showing the practical application example of the circumscribing ray route lens of the present invention.

Here, in the FIG. 32, I will summarize the other advance working configuration of the circumscribing ray route lens 1 of the present invention in addition to the working configuration as described above. First, adaptations for former working such as hot-water generator, the production of electric power by solar energy is thought. As a advance working configuration of condensing the sunlight at a large scale, chemical industry, seawater desalinization, heat for air conditioning, and drying by heating air are thought. Besides, in the air cooling by dehumidifying with calcium chloride solution, this invention is able to be used to boil the calcium chloride solution to be enriched. Besides, as a advance working configuration, this invention can provides energy for a heat engine like Stirling engine as a power source.

Further, the steam provided by boiling is able to be used as thermic energy as air heating. Besides, the steam is able to be used to make hydrogen and carbon dioxide with coke. Hydrogen and carbon dioxide made like this are in the blended state. Hydrogen is able to be separated from the gas by absorption of a certain alloy, thus the hydrogen is able to be used as fuel of hydrogen engine automobile or fuel cell. And the carbon dioxide left after the separation is able to be used for photosynthesis of Chlorophyta. Chlorophyta increased in this way is able to be used as food or medicine directly, however, it is able to be used as food for freshwater fishes. Besides, the freshwater fishes are able to be made into high-quality protein food. Further, said Chlorophyta is able to be used as fuel or manure.

Besides, as the new use of the circumscribing ray route lens 1 of the present invention, personal house, factory, building, lighting underground, and dispersion of light and so on are thought. In addition to this, as other ways of leading the sunlight to various places, to lead the sunlight condensed by the circumscribing ray route lens 1 of the present invention through optical fiber is thought.

As set forth hereinabove, according to the circumscribing ray route lens of claim 1 of the invention, the incident light is able to be transmitted within a elected region by refraction of the refraction condensing light means in case the incidence angle of the incident light is within a fixed region. And the incident light is able to be transmitted within a elected region by total reflection of the total reflection condensing light means in case the incidence angle of the incident light is out of the fixed region. Therefore, the sunlight of which incidence angle changes momently from sunrise to sunset is able to be condensed almost within a fixed region even on condition that the location and direction of the lens is constant, especially when the sunlight scatters as on a cloudy day.

According to the circumscribing ray route lens of claim 2 of the invention, the incident light is able to be transmitted within a elected region by total reflection of the total reflection surface in case the incidence angle of the incident light is out of the fixed region, thus the incident light is able to be transmitted within a elected region in spite of the incidence angle being various. Therefore, the sunlight of which incidence angle changes momently from sunrise to sunset is able to be condensed almost within a fixed region even on condition that the location and direction of the lens is constant, especially when the sunlight scatters as on a cloudy day.

According to the circumscribing ray route lens of claim 3 of the invention, in addition to the same effect of the circumscribing ray route lens of claim 2, a lens flat as a Fresnel lens is able to be produced in thinner state for its whole size in accordance with the improvement of its technology by means of increasing the plural circumscribing ray route sections lying in series at a fixed distance. Therefore, the quantity of the transmitted light is able to be prevented from decreasing to the utmost.

According to the circumscribing ray route lens of claim 4 of the invention, in addition to the same effect of the circumscribing ray route lens of claims 1 through 3, the light incident upon the ray receiver surface convex in shape converges, and the transmitted light emitted from the transmitted light emitter surface concave in shape returns to be a parallel ray again. Therefore, the boundary of the incidence angle whether the light is transmitted with only refraction or with total reflection is able to be made clear, the distribution region of the refraction angle is able to be narrower to the utmost, and the efficiency of condensing light is able to be improved.

According to the circumscribing ray route lens of claim 5 of the invention, in addition to the same effect of the circumscribing ray route lens of claims 1 through 4, the dust accumulating on the upper surface of the circumscribing ray route lens is able to be got rid of because of the flat board made up of transparent material on the side of the ray receiver surface. Therefore, the transmission factor of the light is kept constant as it is without paying attention, and the condensing factor of the light is kept constant.

According to the condensing light system 6 of the invention, the sunlight incident out of the elected region for condensing is able to be emitted within the elected region for condensing in spite of the incidence angle of the sunlight changing momently, thus the energy density of the sunlight which the elected region receives is able to be kept high to the utmost constantly. Therefore, if some kinds of absorbing thermic energy means or means for transducing into electric energy are arranged within the elected region for condensing sunlight, the solar energy is able to be used effectively, and the cost of equipment is able to go down. For example, in case the absorbing thermic energy means as a solar hot-water generator is arranged with in the elected region for condensing the sunlight, the thermometer of the refrigerant is able to be more hot. So if this thermic energy is used for a absorption system of refrigeration as a power source, the working efficiency is able to be improved more than in case of not condensing the sunlight. Such improvement of energy density shown in the working efficiency described before is able to make the solar energy possible to be used for a heat engine like Stirling engine as a power source. Besides, if the means for transducing into electric energy like a solar cell is arranged within the elected region for condensing sunlight, the generated electric energy increases in accordance with the increase of the received light, so the quantity of light which the solar cell receives is able to increase more cheaply than in case of increasing the solar electricity generator, and the cost of solar equipment per quantity of generated electric energy is able to go down.

According to the condensing light system 7 of the invention, in addition to the same effect of the condensing light system of claim 6, the sunlight is able to be condensed more easily than by any other condensing light system considerable, thus the cost of equipment is easy to decrease.

According to the condensing light system 8 of the invention, the direction of the sunlight of which incidence angle against the horizontal surface changes momently is limited to a fixed region by the helping means in spite of the passing time, and the sunlight is able to be irradiated to a condensing light means comprising said plural lenses arranged in a state of transmitted light being emitted within a fixed region in accordance with the arrangement location of each said lens, thus the condensing light system is able to be used under the condition which causes the best condensing efficiency. Therefore, the condensing efficiency is able to be improved better than in case of the condensing light system comprising only said lenses of which movement is fixed.

According to the condensing light system of claim 9 of the invention, in addition to the same effect of the condensing light system of claims 6 through 8, solar energy is absorbed as thermic energy by the absorbing thermic energy means, thus the solar energy is able to be used more effectively than in case of the solar energy is changed into another type of energy.

According to the condensing light system of claim 10 of the invention, in addition to the same effect of the condensing light system of claim 9, the thermic energy absorber element received the transmitted light in the liquid emits thermic energy with exchanging solar energy into thermic energy, thus most part of the solar energy of the light emitted to the chamber is exchanged into thermic energy in the liquid. Therefore, the thermic energy is prevented from going out of the chamber and the efficiency exchanging solar energy into thermic energy is able to be improved.

According to the condensing light system of claim 11 of the invention, in addition to the same effect of the condensing light system of claim 10, the thermic energy absorber element is made up of a black body, thus the efficiency exchanging solar energy into thermic energy is able to be improved to the utmost.

According to the condensing light system of claim 12 of the invention, in addition to the same effect of the condensing light system of claims 10 or 11, the thermic energy absorber element comprises: one part arranged near the surface of the liquid in the chamber; and the other part arranged at the bottom of the chamber, thus the solar energy of the light transmitted through the part of the thermic energy absorber element arranged near the surface of the liquid in the chamber is able to be absorbed by the other part of the thermic energy absorber element arranged at the bottom of the chamber. Therefore, the efficiency exchanging solar energy into thermic energy is able to be improved to the utmost.

According to the condensing light system of claim 13 of the invention, in addition to the same effect of the condensing light system of claims 10 through 12, the liquid which will be heated in the high temperature cistern is preheated by the light having leaked out around the high temperature cistern, thus the energy of the light having leaked out around the high temperature cistern is able to be used effectively to the utmost.

According to the condensing light system of claim 14 of the invention, in addition to the same effect of the condensing light system of claims 10 through 13, in spite of changing the volume of the liquid accommodated in the chamber irregularly for example as in case of washing something or using hot water in bathing, the liquid surface in the chamber is able to be kept constant by changing the volume of the air cistern, thus the use of the equipment for supplying liquid for example as a pump is able to be decreased to the utmost, and the life of the equipment for supplying liquid is able to be prolonged. Besides, because the liquid surface in the chamber is able to be kept constant within a fixed change of the volume of the liquid as described above, the temperature of the liquid in the chamber is able to be prevented from going down by supplying liquid of the equipment unnecessarily.

According to the condensing light system of claim 15 of the invention, in addition to the same effect of the condensing light system of claims 6 through 8, the light condensed within the elected region for condensing the sunlight is given plural corrections to limit the progress direction vertically downward constantly by other plural lenses same as said lens arranged in plural layers in series, thus the condensed light can reach deep in a ray route vertically draughty.

According to the condensing light system of claim 16 of the invention, in addition to the same effect of the condensing light system of claim 15, some part of the sunlight is read to every room of each floor of the plural-story building, in addition to this, the loss of the solar energy between before and after of which progress direction is changed decreases, thus the lighting indoor is able to be cut down to the utmost.

According to the condensing light system of claim 17 of the invention, in addition to the same effect of the condensing light system of claim 15, by having the air exhauster, the use of another air exhauster is able to be decreased.

According to the condensing light system of claim 18 of the invention, in addition to the same effect of the condensing light system of claims 16 or 17, all of the solar energy gained by the condensing light system is able to be used effectively to the utmost.

According to the condensing light system of claim 19 of the invention, in addition to the same effect of the condensing light system of claims 6 through 18, a solution is able to be boil to be enriched without exhausting the carbon dioxide and other harmful gas, thus the object is able to be achieved without environmental pollution.

According to the condensing light system of claim 20 of the invention, in addition to the same effect of the condensing light system of claim 9, the thermic energy absorber element received the transmitted light in the air of the chamber emits thermic energy with exchanging solar energy into thermic energy, thus most part of the solar energy of the light emitted to the chamber is exchanged into thermic energy in the air of the chamber. Therefore, the thermic energy is prevented from going out of the chamber, and the efficiency exchanging solar energy into thermic energy is able to be improved.

According to the condensing light system of claim 21 of the invention, in addition to the same effect of the condensing light system of claims 6 through 8, a means for transducing into electric energy is arranged within the elected region for condensing sunlight, and the generated electric energy increases in accordance with the increase of the received light by condensing, so the quantity of light which the means for transducing into electric energy receives is able to increase more cheaply than in case of increasing the means for transducing into electric energy, and the cost of solar equipment per quantity of generated electric energy is able to go down.

According to the lighting of claim 22 of the invention, the progress direction of the light going along the ray route is changed at the bended points of the ray route by total reflection, thus the loss of the solar energy between before and after of reflection is able to be cut down much better than in case of using a mirror.

According to the lighting of claim 23 of the invention, part of the light incident upon the side from which the light is usually emitted is emitted from the ray receiver surface after process of the total reflection, and the other part of the light incident upon the side from which the light is usually emitted is emitted from the ray receiver surface directly without reflected totally, thus progress direction of the light incident from a fixed direction is separated into two different directions, therefore a parallel ray of light is able to be dispersed. Besides, the loss during the light is transmitted is able to be decreased much better than in case of using a frosted glass which scatters the light toward the irregular directions. Therefore, this way of lighting is suitable for a skylight for leading the sunlight indoors very much.

While the invention has been particularly shown and described with reference to preferred embodiments thereof, it will be understood by those skilled in the art that the foregoing and other changes in form and details can be made therein without departing from the spirit and scope of the invention.

What is claimed is:

1. A lens section, the lens section being adapted for use in a circumscribing ray route lens system configured to redirect and condense incident light, the lens system comprising a plurality of lens sections joined together in a side-by-side manner, the lens section comprising:

a ray receiver surface convex in shape adapted to receive incident light;

a transmitted light emitter surface for emitting transmitted light; and a total reflection surface disposed between the ray receiver surface and the transmitted light emitter surface for transmitting the incident light within a first fixed region of incidence angle by total reflection, wherein the transmitted light emitter surface includes a first concave emitter section and a second concave emitter section, the first concave emitter section being adapted to emit light incident on the lens system from within the first fixed region of angles, and the second concave emitter section being adapted to emit light incident on the lens system from within a second fixed region of incident angles.

2. A circumscribing ray route lens system, comprising a plurality of lens sections of substantially the same size, shape and orientation, joined together in a side-by-side configuration, each lens section comprising:

a ray receiver surface convex in shape adapted to receive incident light;

a transmitted light emitter surface concave in shape for emitting transmitted light, the transmitted light emitter surface including a plurality of concave emitter sections; and a total reflection surface disposed between the ray receiver surface and the transmitted light emitter surface;

wherein the plurality of lens sections are arranged such that the total reflection surfaces of the plurality of lens sections are in series at a fixed distance from adjacent total reflection surfaces.

3. The lens system of claim 2, wherein the lens system has a side formed by the ray receiver surfaces, the lens system further comprising a flat board made up of transparent material disposed on the side of the lens system formed by the ray receiver surfaces.

4. A condensing light system having a plurality of lens systems of claim 2, wherein the plural lens systems are arranged such that transmitted light is condensed on an elected region.

5. The condensing light system of claim 4, wherein said plural lens systems are arranged on a first side and a second side above the elected region such that the total reflection surface of each lens system is turned toward the elected region.

6. The condensing light system of claim 5, wherein the plural lens systems are positioned in a convex arrangement over the elected region, the condensing light system further comprising helping means comprising other plural lens systems arranged above the convex arrangement, wherein the helping means are configured to make each lens follow the movement of a source of transmitted light so as to keep the emitting direction of light transmitted through the lens substantially vertically downward.

7. The condensing light system of claim 4, characterized by an absorbing thermic energy means arranged within the elected region for absorbing solar energy condensed on the elected region as thermic energy.

8. The condensing light system of claim 7 in which the absorbing thermic energy means comprises:

a chamber for accomodating a liquid so that condensed light can reach the liquid; and a thermic energy absorber element arranged in the liquid.

9. The condensing light system of claim 8 in which the thermic energy absorber element is made up of a black body.

10. The condensing light system of claim 8 in which the thermic energy absorber element comprises:

a first part arranged near the surface of the liquid in the chamber; and a second part arranged at the bottom of the chamber.

11. The condensing light system of claim 8, wherein the chamber comprises a high temperature cistern arranged within the elected region for condensing sunlight, and a preheating cistern divided into plural sections which are arranged around the high temperature cistern, wherein the high temperature cistern is configured such a that the liquid in the high temperature cistern is centered in the elected region for heating the liquid, wherein the preheating cistern is adapted so that the liquid in the preheating cistern is heated by transmitted light that leaks from the high temperature cistern, and wherein the liquid in the preheating cistern replaces liquid drawn from the high temperature cistern.

12. The condensing light system of claim 8, the liquid in the chamber having a surface level, the condensing light system further comprising an air cistern in communication with the chamber, the air cistern having a changeable volume, wherein the air cistern is adapted for keeping the surface level of the liquid constant by changing its volume in accordance with changes in the volume of the liquid in the chamber.

13. The condensing light system according to claim 7 in which the absorbing thermic energy means is characterized by:

a chamber made up of transparent material and having a structure that air can pass through inside; and a thermic energy absorber element arranged in the chamber.

14. The condensing light system of claim 4, wherein at least some of the plurality of lens systems are arranged in plural layers in series with the elected region for condensing sunlight in a vertically downward direction.

15. The condensing light system of claim 14, wherein the condensing light system is adapted to be used in a building to direct condensed light vertically downward in a first ray route continuous through a plurality of floors of a building of plural stories, and wherein the condensing light system includes at least one lens system for leading some condensed light in a second ray route along at least one floor of the building.

16. The condensing light system of claim 15, the first ray route having a lower end, wherein the condensing light system is characterized by an absorbing thermic energy means on which the condensed light is focused at the lower end of the first ray route to absorb solar energy as thermic energy.

17. The condensing light system of claim 14, wherein the condensing light system is adapted to be used in an air exhauster that utilizes a chimney effect which is caused by heating air in the air exhauster with a thermic energy absorber element positioned in the air exhauster such that the absorber element is heated by the condensed light.

18. The lens system of claim 17, the air exhauster including a bottom, wherein the thermic energy absorber element includes a portion positioned adjacent the bottom of the air exhauster.

19. The condensing light system of claim 4 adapted to be used for enriching a solution by boiling.

20. The condensing light system of claim 4 characterized by a means for transducing condensed light into electric energy, wherein the means for transducing is arranged within the elected region.

21. The lens system of claim 2, wherein the lens system is adapted to be used in a lighting system comprising a ray route with a bend, wherein the lens system is positioned at the bend of the ray route and is adapted to change the progress direction of the light along the ray route.

22. The lens system of claim 2, wherein the lens is adapted to be arranged in a lighting system such that the ray receiver surface is positioned to emit transmitted light and the transmitted light emitter surface is arranged to receive incident light.

23. A light-condensing lens system configured to condense incident light from a wide range of incident angles to a more narrow range of transmitted angles, the lens system comprising a plurality of individual lens sections of substantially the same size, shape and orientation arranged in a side-by-side manner, each lens section comprising a convex incident light receiver surface, a concave transmitted light emitter surface, and a total reflection surface disposed between the light receiver surface and the light emitter surface, wherein the lens is configured such that all incident light from a first fixed region of incident angles is transmitted by internal reflection, and all incident light from a second fixed region of incident angles is transmitted without being internally reflected.

* * * * *